United States Patent [19]

Sano et al.

[11] Patent Number: 5,638,465

[45] Date of Patent: Jun. 10, 1997

[54] IMAGE INSPECTION/RECOGNITION METHOD, METHOD OF GENERATING REFERENCE DATA FOR USE THEREIN, AND APPARATUSES THEREFOR

[75] Inventors: Mutsuo Sano, Iruma; Masashi Okudaira, Yokosuka; Eiji Mitsuya, Hannou; Joji Sahashi, Yokohama; Hisao Kuroda, Atsugi; Shuichi Ohara, Kodaira, all of Japan

[73] Assignee: Nippon Telegraph and Telephone Corporation, Tokyo, Japan

[21] Appl. No.: 488,892

[22] Filed: Jun. 9, 1995

[30] Foreign Application Priority Data

Jun. 14, 1994 [JP] Japan .................................. 6-131649
Jun. 20, 1994 [JP] Japan .................................. 6-136210

[51] Int. Cl.$^6$ ........................................................ G06K 9/00
[52] U.S. Cl. ............................................. 382/281; 382/159
[58] Field of Search ................................ 382/190, 191, 382/192, 195, 199, 201, 203, 205, 128, 135, 137, 138, 155, 156, 157, 158, 159, 160, 161, 168, 170, 172, 181, 209, 217, 218, 219, 220, 221, 224, 276, 281, 282, 286, 312, 177, 178; 364/413.13; 395/94, 84; 348/92

[56] References Cited

U.S. PATENT DOCUMENTS

| | | | |
|---|---|---|---|
| 4,567,610 | 1/1986 | McConnell | 382/18 |
| 4,613,269 | 9/1986 | Wilder et al. | 364/513 |
| 4,618,989 | 10/1986 | Tsukune et al. | 382/25 |
| 5,097,517 | 3/1992 | Holt | 382/7 |
| 5,208,869 | 5/1993 | Holt | 382/7 |
| 5,231,580 | 7/1993 | Cheung et al. | 364/413.13 |

*Primary Examiner*—Leo Boudreau
*Assistant Examiner*—B. Tadayon
*Attorney, Agent, or Firm*—Pollock, Vande Sande & Priddy

[57] ABSTRACT

An image of a part is used to judge whether it is good or no good. A predetermined intensity, edge or similar feature image is extracted from the inspected image and is quantized. The quantized feature image is obtained from a training image in advance, and the feature is subjected to a generalized Hough transform operation which refers to the weight of each feature point for each feature value in the image and vote the feature point weight. The similarity is obtained from the results of the transform operation, and a good/no good judgement is made depending upon whether the similarity is above or below a threshold value.

21 Claims, 27 Drawing Sheets

FIG. 2A
STANDARD IMAGE 21
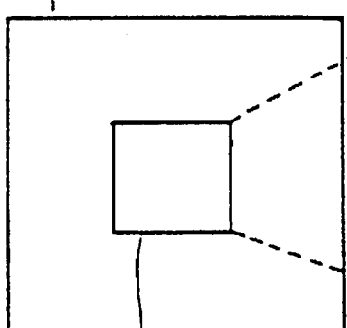
22 STANDARD WINDOW
FIG. 2B
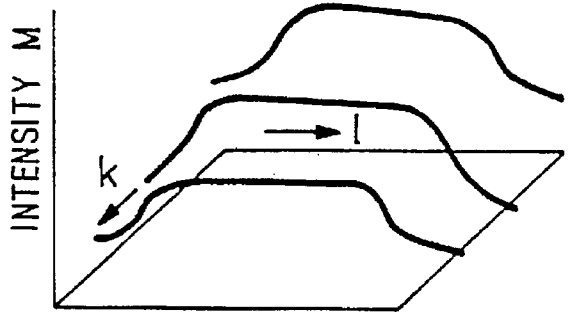
23 INSPECTION IMAGE
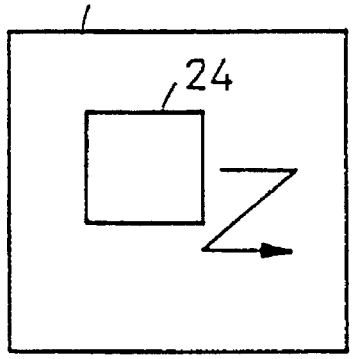
24
FIG. 2C
FIG. 2D
INSPECTED INTENSITY PATTERN
27  26
25 STANDARD INTENSITY PATTERN
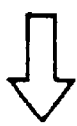

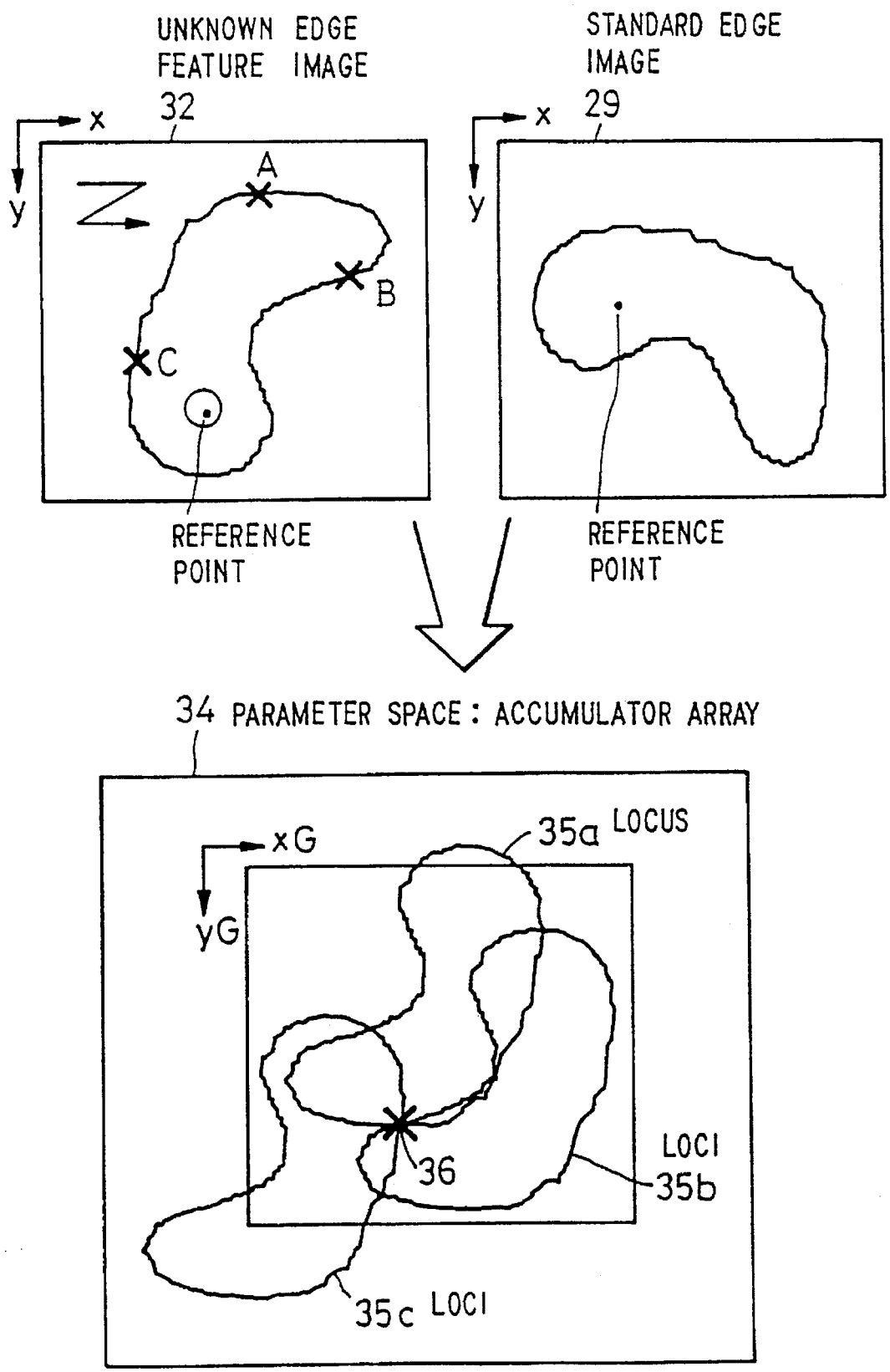

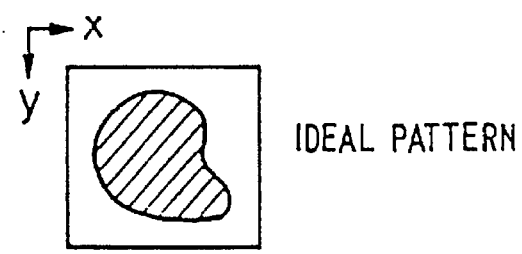
FIG. 6A IDEAL PATTERN
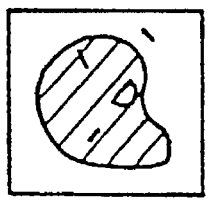 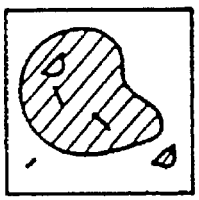 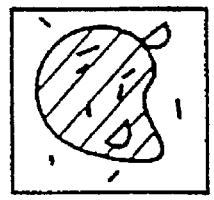 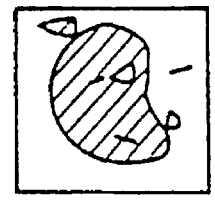
GOOD    GOOD    GOOD    N GOOD
FIG. 6B    FIG. 6C    FIG. 6D    FIG. 6E

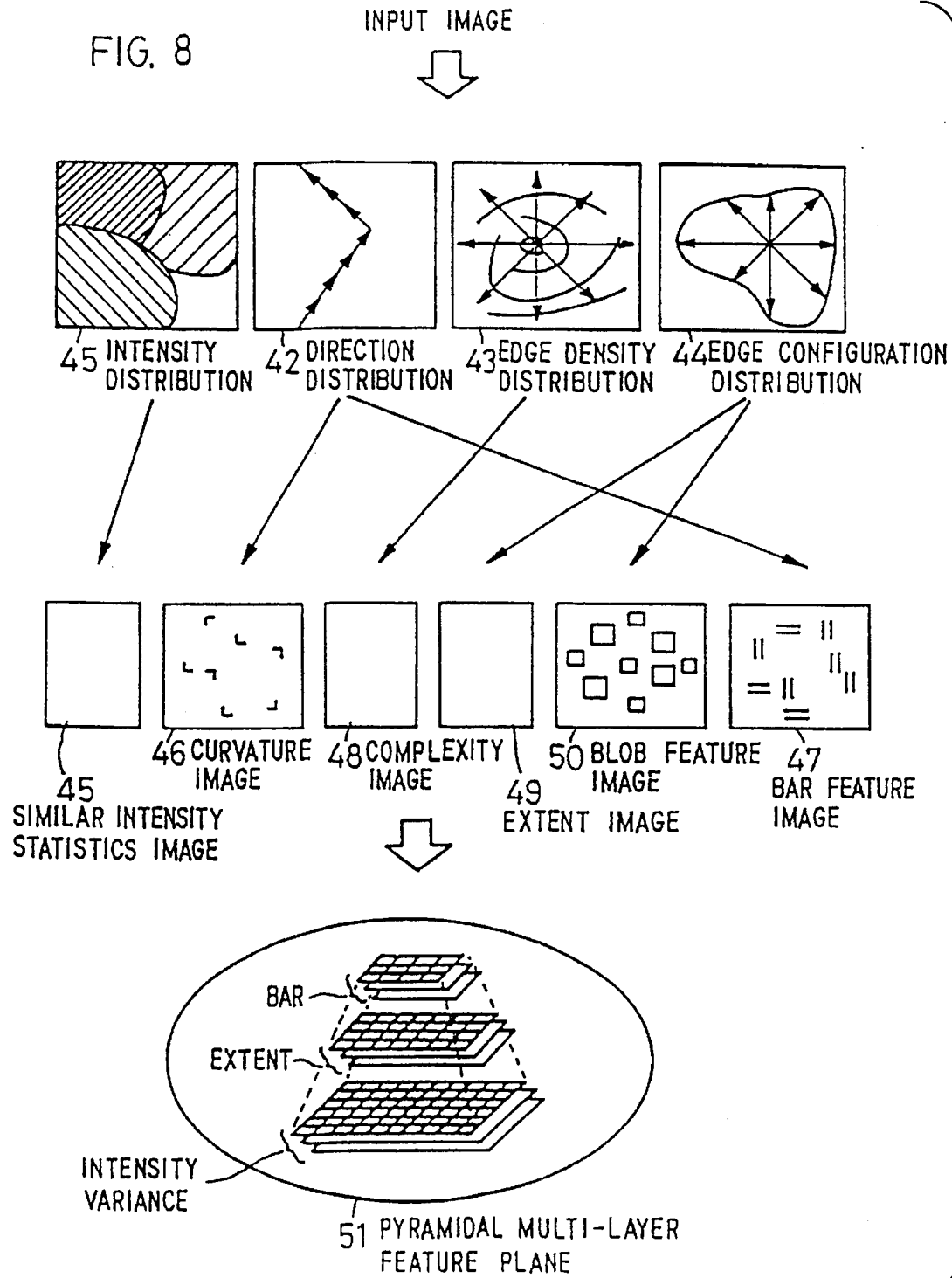

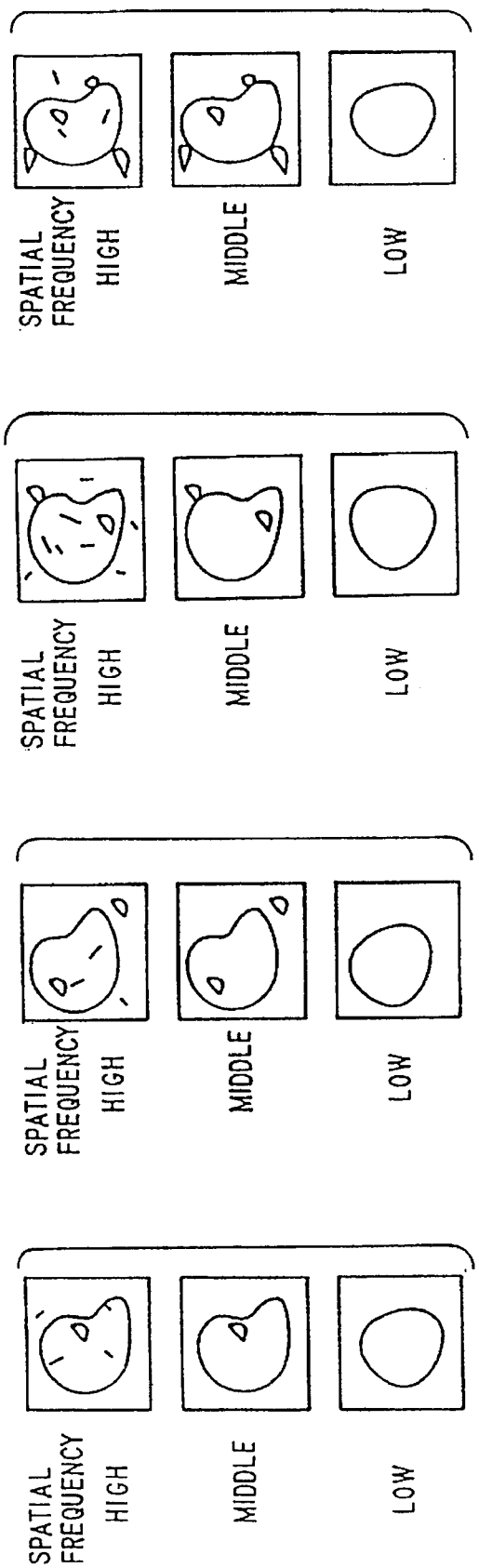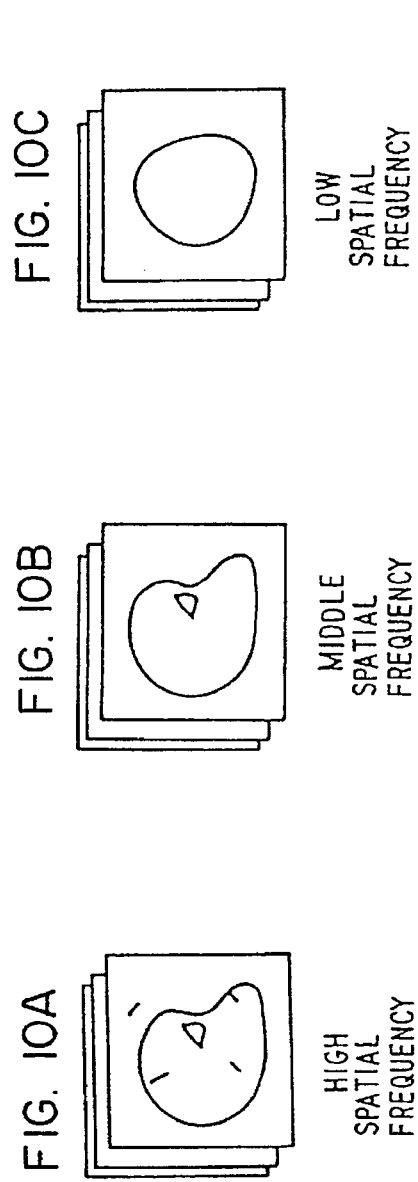
FIG. 9A  FIG. 9B  FIG. 9C  FIG. 9D
FIG. 10A  FIG. 10B  FIG. 10C FIG. 13
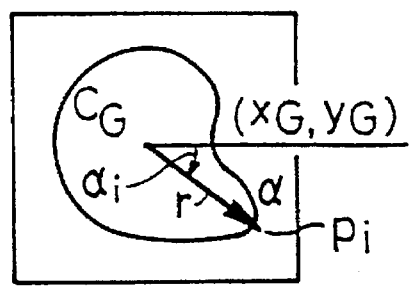
| SPATIAL FREQUENCY | 61 REFERENCE TABLE | |
|---|---|---|
| HIGH | $(r_i(1), \alpha_i(1), W_i(1))$  $i=1,...,N_p(1)$ | 61a |
| MIDDLE | $(r_i(2), \alpha_i(2), W_i(2))$  $i=1,...,N_p(2)$ | 61b |
| LOW | $(r_i(3), \alpha_i(3), W_i(3))$  $i=1,...,N_p(3)$ | 61c |

|     | 61 |
|-----|-----|

| f(1) | index | address & weight |
|------|-------|------------------|
|      | $I_0(1)$ | ................ |
|      | $I_1(1)$ | ................ |
|      | . | . |
|      | . | . |
|      | $I_j(1)$ | $(r_{ji}(1), \alpha_{ji}(1), w_{ji}(1))$     $i=1,\cdots,N_{jp}(1)$ |
|      | . | . |
|      | . | . |

$61_1$

| f(2) | index | address & weight |
|------|-------|------------------|
|      | $I_0(2)$ | ................ |
|      | $I_1(2)$ | ................ |
|      | . | . |
|      | . | . |
|      | $I_j(2)$ | $(r_{ji}(2), \alpha_{ji}(2), w_{ji}(2))$     $i=1,\cdots,N_{jp}(2)$ |
|      | . | . |
|      | . | . |

$61_2$

.
.
.

| f(N) | index | address & weight |
|------|-------|------------------|
|      | $I_0(N)$ | ................ |
|      | $I_1(N)$ | ................ |
|      | . | . |
|      | . | . |
|      | $I_j(N)$ | $(r_{ji}(N), \alpha_{ji}(N), w_{ji}(N))$     $i=1,\cdots,N_{jp}(N)$ |
|      | . | . |
|      | . | . |

| index | address & weight |
|---|---|
| 0 | |
| 1 | $(r_i(1), \alpha_i(1), w_i(1))$  $i=1,\cdots,N_p(1)$ |
| 2 | |
| ... | ... |

$f(1) : W(1)$ — $61_1$

| index | address & weight |
|---|---|
| 0 | |
| 1 | $(r_i(2), \alpha_i(2), w_i(2))$  $i=1,\cdots,N_p(2)$ |
| 2 | |
| ... | ... |

$f(2) : W(2)$ — $61_2$

| index | address & weight |
|---|---|
| 0 | |
| 1 | $(r_i(N), \alpha_i(N), w_i(N))$  $i=1,\cdots,N_p(N)$ |
| 2 | |
| ... | ... |

$f(N) : W(N)$ — $61_N$ $\underline{61}$

71_1 f(1)
$(x_1(1), y_1(1), f_1(1), w_1(1)) \quad (x_2(1), y_2(1), f_2(1), w_2(1))$
... $(x_{NP}(1), y_{NP}(1), f_{NP}(1), w_{NP}(1))$

71_2 f(2)
$(x_1(2), y_1(2), f_1(2), w_1(2)) \quad (x_2(2), y_2(2), f_2(2), w_2(2))$
... $(x_{NP}(2), y_{NP}(2), f_{NP}(2), w_{NP}(2))$

71_N f(N)
$(x_1(N), y_1(N), f_1(N), w_1(N)) \quad (x_2(N), y_2(N), f_2(N), w_2(N))$
... $(x_{NP}(N), y_{NP}(N), f_{NP}(N), w_{NP}(N))$

Extent feature = $\sum_{i=1}^{n} d_i/n$

IMAGE INSPECTION/RECOGNITION METHOD, METHOD OF GENERATING REFERENCE DATA FOR USE THEREIN, AND APPARATUSES THEREFOR

BACKGROUND OF THE INVENTION

The present invention relates to an image inspection/recognition method for making a visual inspection of objects for defects, for instance, or visually sorting or recognizing them through the use of their images. The invention also pertains to an apparatus for generating reference data for use in the visual inspection or recognition of objects.

A description will be given first of typical inspection methods heretofore employed.

Referring to FIG. 1, a conventional inspection method will be described which utilizes binarization processing. Now, assume that a projected image of an object under inspection is such as shown in FIG. 1A and consider its visual inspection to determine the severity of a chip or dilation of a central rectangular region 11a of the image.

In FIG. 1A, the intensity of the image is shown to increase in the order of regions 11b-11c-11d-11a. An intensity variation on a broken line 12 passing through the centers of the regions 11a and 11d in the image is such as indicated by the curve 15 in FIG. 1B, which is obtained by adding together a step-like variation indicated by the curve 13 and a variation indicated by the curve 14; the curve 15 is binarized (patterned) by dividing individual intensity values into those below and those above a threshold value 16. The threshold value 16 for this binarization is, as shown in FIG. 1C, set to an intensity value corresponding to the minimum number of pixels between intensity histogram curves 17a and 17d in the regions 11a and 11d. Usually, such an ideal step-like pattern as indicated by the curve 13 is not provided; in practice, such a pattern as indicated by the curve 15 is provided which contains intensity variations caused by a spot on the surface of the object or change in the condition of its illumination, and the pattern is subjected to binarization processing through the use of the threshold value 16. The binarization processing is carried out over the entire area of the noted rectangular region 11a and the resulting intensity distribution pattern in binary terms is checked to see if the object under inspection is good. It is desirable to set the threshold value 16 in anticipation of such an intensity variation pattern 14, but this involves much difficulty in many cases. If the threshold value 16 is set to a wrong value, variation components 19 such as the diagonally shaded areas in FIG. 1D are generated under the direct influence of a spot or changes in the condition of illumination, and the configuration of the binarized pattern of the rectangular region 11a does not match its actual configuration because of such variation components. Thus, it is impossible to detect and judge defects of the object such as chips and dilations thereof.

Turning next to FIG. 2, a description will be given of another conventional visual inspection method which employs an intensity normalized correlation scheme. The intensity distribution $M_{kl}$ (where k=1, ..., K and l=1, ..., L) is calculated over the entire area of a standard window 22 in a standard image 21 shown in FIG. 2A, which is the object to be inspected, and the distribution is registered as intensity patterns, as depicted in FIG. 2B. A region 24 in an inspection image 23 shown in FIG. 2C, which corresponds to the standard window 22, is scanned from the top left-handed corner to the bottom right-handed corner of the region 24 and the following calculation is made for each scanning point (i, j) to compute a correlation factor $\gamma_{ij}$ (where $-1 \leq \gamma_{ij} \leq 1$).

$$\gamma_{ij} = \sum_{k=1}^{K}\sum_{l=1}^{L}(T_{i+k,j+l}-T_0)(M_{kl}-M_0) / \left\{ \sum_{k=1}^{K}\sum_{l=1}^{L}(T_{i+k,j+l}-T_0)^2 \sum_{k=1}^{K}\sum_{l=1}^{L}(M_{kl}-M_0)^2 \right\}^{1/2}$$

where $M_0$ is the mean intensity value in the standard window 22 and $T_0$ is the mean intensity value in the region 24 in the inspection image.

The maximum value $\gamma_{max}$ is detected from such correlation factors $\gamma_{ij}$ defined for individual scanning points; the closer to unity the maximum value $\gamma_{max}$ is, the more the object under inspection is judged as being good. The correlation factor is immune from varying with an offset variation of the intensity but undergoes variations corresponding to a spot, change in the condition of illumination, or similar uneven intensity change, as indicated by the diagonally shaded areas 27 surrounded by a standard intensity pattern 25 and an inspected intensity pattern 26 in FIG. 2D; that is, the correlation factor greatly changes even for a good object, resulting in the object under inspection being misjudged.

To implement the above-described image or visual inspection methods, it is important what image features are to be extracted (an image feature extraction method), which image feature is to be used (an image feature selection method) and how the selected image feature is to be used (a matching method).

Various image feature extraction methods are disclosed in Japanese Pat. Laid-Open No. 226785/88 entitled "Image Feature Extracting Apparatus." According to this prior art literature, the object image is processed to extract therefrom a region feature image which reflects the properties of its noted region, such as the intensity statistics, complexity and extent of the image, and a contour feature image which reflects the properties of its contour, such as edges and their inflectivity. The above-mentioned noted region in the region feature image is a localized region to be processed by localized filtering, not a region obtained by segmentation.

The intensity statistics is a feature value of each pixel that is defined by the variance or dispersion in the intensity value within a certain extracting field radius from the pixel. The complexity is a feature value of each pixel that is defined by the mean value of the total sum of edges accumulated on respective radial scanning lines from the pixel within a certain extracting field radius. In this instance, wt(r)=a/$r_k$ (where a and k are constants and r is the address of each scanning line) to increase the output sharpness and, with a view to calculating the true edge density, a simple accumulated number of edges is not used but the number of times each scanning line crosses edges is accumulated. The extent is a quantity corresponding to the area of the region and is a feature value of each pixel that is defined by the mean value of lengths of radial scanning lines from the pixel within a certain extracting field radius to edges which the scanning lines meet for the first time, respectively. The edge inflectivity is calculated as the difference (a square norm) between the respective direction from each pixel toward the edge within a certain extracting field radius and the respective direction of the edge from the neighboring pixel. On the account of an integration effect, this feature is highly immune to being affected by a break in the edge due to an external disturbance.

The region feature image and the contour feature image are image features complementary to each other; only the region feature cannot sufficiently represent the configuration of the object and only the contour feature cannot sufficiently represent the difference in texture, either. Moreover, the region feature image and the contour feature image differ in the sensitivity to noise. The region feature value does not scatter over a wide range even if there are some breaks in the contour by noise. The application of such image features of different properties to object inspection and recognition is to represent the image from various angles, and the use of many such complementary feature images will ensure high reliability in the inspection and recognition of objects.

The use of the image feature extraction method and the matching method have already been proposed in Japanese Pat. Laid-Open No. 175885/92 entitled "Image Feature Selection Method in Generalized Hough Transform." In FIG. 3 there is shown a flowchart of a procedure involved in the proposed image feature selection method.

The procedure starts with step S1 in which standard samples are selected for respective categories, that is, good and no good objects in inspection and a plurality of objects to be distinguished from each other in sorting and recognition; and feature images of different properties are extracted from the sample images and used as standard feature images. Then, feature points are selected for each standard feature image. For example, when the feature image is an edge image, each pixel at each point (a feature point) representing each edge is selected from the edge image. When the feature image is an intensity image, each pixel (a feature point) which takes each quantized intensity value (a feature value) is selected from the intensity image. In step S2, a reference table is prepared for each feature of the respective category in correspondence with such a selected feature point. The reference table, identified by 27 in FIG. 4, uses each feature value $f_i$ as an index to hold the position of each pixel of the feature value (i.e. the feature point in the feature image) as a polar coordinate vector $(\gamma_i, \alpha_i)$, where i=1, . . . , $N_p$ ($N_p$ being the number of feature points) with the origin at a reference point. The reference point is not a particular point in principle, but it is known in the art that when the reference point is set at the position of the center of gravity of an object, a transform error in the generalized Hough transform is minimized.

In step S3, a feature image of each feature is extracted, for each category, from M samples with various external disturbances, and the feature image and the reference table prepared in step S2 are used to conduct the generalized Hough transform.

Referring to FIG. 4, the principle of deriving the generalized Hough transform will be described taking an edge as an example. An edge image (a standard feature image) 28 of a standard image represent contour points of an object. Hence, the feature point of the edge image is each contour point; its feature value, that is, an edge value is "1" and an edge value except the contour point is "0." Consequently, in step S2, only the value "1" at the edge point is stored as an index in an index column of the feature point value $f_i$ of the reference table 27 and the polar-coordinate address $(\gamma_i, \alpha_i)$ of each image (the feature point) $p_i$ of a contour image (an edge image) 29 of the edge image 28 of the standard image, where i=1, . . . , $N_p$ ($N_p$ being the number of contour points, that is, the number of feature points), is stored in an address column of the reference table 27. Next, a description will be given of how an unknown input image 31 is processed using the reference table 27 in step S3. The parameters that are desired to calculate in this case are the position and pose (rotation angle) of the object in the input image 31. The position of the object is the position of the reference point (the origin of the polar coordinates) already determined in the standard feature image 28, that is, the reference point of the object in the input image 31. A feature image identical with the standard feature image, that is, an edge image 32, is produced for the input image 31, and only when the edge value of each pixel (whose orthogonal coordinates is (x,y)) of the edge image 32 is "1" which is the value (the feature value) stored in the reference table 27, the polar-coordinate addresses $(\gamma_i, \alpha_i)$ stored in the reference table 27 corresponding to the feature value are read out one by one to perform the following address translation.

$$x_G = x + r_i \cos(\alpha_i + \theta)$$

$$y_G = y + r_i \sin(\alpha_i + \theta)$$

where $\theta$ is the rotation angle of the object. Now, let it be assumed, for brevity's sake, that the rotation angle $\theta$ of the object is preknown. The coordinates $(x_G, y_G)$ thus calculated by such an address translation is the position which is likely to be the reference point of the object that is predicted. As shown in FIG. 5, each address $(x_G, y_G)$ converted for one pixel position (x,y) where the edge value "1" was obtained is voted by one to the value at the position $(x_G, y_G)$ on an accumulator array 34 which is a parameter space. That is, all addresses stored in the reference table 27 are sequentially read out therefrom in correspondence with, for example, the point A in an unknown edge feature image 32 and then converted, and sequential voting of such converted addresses $(x_G, y_G)$ to the value at the position $(x_G, y_G)$ on the accumulator array 34 means that a locus (of the value "1") 35a, which is likely to be the reference point, is physically laid down on the accumulator array 34. By performing similar processing for the points B and C in the unknown edge feature image 32, loci 35b and 35c are obtained. The value at each position $(x_G, y_G)$ on the accumulator array 34 is a voted (accumulated) value; hence, when the loci 35b and 35c intersect the locus 35a once, the value at the intersection goes to 2 and when they intersect the locus 35a twice, the value at the intersection goes to 3. Assuming that the relative position of the edge image of the unknown edge feature image 32 to the edge image 29 of the standard edge feature image 28 is held unchanged at at least the points A, B and C, the three loci 35a, 35b and 35c intersect at one point 36. By performing this processing for all edge points on the unknown edge feature image 32 as well as for the above-mentioned three points, loci which are likely to be the reference point on the accumulator array 34 intersect at the same point $N_p$ times if the object of the input image 31 is exactly identical with the object of the standard image 21. The number of times the loci intersect, that is, the accumulated voting distribution, is obtained as indicated by the curve 37 in FIG. 4, for instance; the calculation of the maximum point (position) and maximum peak value (maximum frequency value) of the distribution is to calculate the position of the reference point in the input image 31 and its circularity relative to the standard image 21. When the rotation angle $\theta$ is unknown, it is varied at a pitch $\Delta\theta$ over the range of the angle $\theta$ alone and similar processing is performed for each rotation angle $\theta$, using the accumulator array 34 as a three-dimensional one $(x_G, y_G, \theta)$, not the two dimensional one ($x_G$, $y_G$). By this, the position is calculated where the maximum peak value ($x_G^*$, $y_G^*$, $\theta^*$) of the accumulated voting distribution is provided. This angle $\theta^*$ is the rotation angle of the object desired to obtain. For example, in the case of an object inspection, the variation range of the rotation angle $\theta$ of the object is predicted to be, for instance, within ±10° taking into account the accuracy of a jig used in the fabrication of the object; in this case, the rotation angle $\theta$ needs only to be varied little by little within the predicted range.

In the address ($x_G^*$, $y_G^*$, $\theta^*$) where the voted value becomes maximum on the accumulator array 34 which is the parameter space, the parameters $x_G^*$ and $y_G^*$ indicate the position of the reference point and $\theta^*$ the rotation angle of the object, and the maximum voted value (the maximum frequency) is a quantity representing the closeness of the input image to the standard one.

In step S3 in FIG. 3, the maximum frequency value is calculated for the respective sample in each category, then an intra-category maximum frequency value distribution is generated, and an inter-category maximum frequency value distribution is produced, for example, for an image sample of a no good object with respect to a good object. Then, the distance between the intra-category maximum frequency value distribution and the inter-category maximum frequency value distribution is calculated for each feature in each category. The distance thus calculated is used to determine the weight of each feature in each category. In step S4, the features in the respective categories are sorted in terms of weight to determine the ranking of the features. In step S5, the number of reference tables for combining the features in descending order of ranking is increased for each category, that is, the number of features that are combined is increased, and each combination is evaluated as to what extent the categories can be distinguished from each other. In step S6 the resolution of the input image is changed, and steps S1 through S5 are repeated until the error rate becomes sufficiently small, that is, until good and no good objects can be distinguished, or until the number of undistinguishable categories is reduced to zero.

By such processing as described above, a plurality of kinds of feature images obtainable from the input image are subjected to generalized Hough transform, using the reference tables of the respective feature images. A distance, which depends on the relationship between an intra- and an inter-variance of the frequency distribution of the generalized Hough transform output on the accumulator array, is used as the weight of each feature. The features are combined in decreasing order of weight and the distance between the categories is evaluated, and the features are combined one after another until the weighted distance exceeds a certain value or until the relationship of the input image to the standard one is no longer improved. In the aforementioned Japanese Pat. Laid-Open, there are proposed the weighting of feature sets and the selection of combinations of the feature sets.

As regards the feature point selecting method, however, the prior art literature does no more than propose the selection of feature points remotest from each other in each feature image obtainable from the standard image. With this feature point selecting method, when some of the feature points of the standard image to be selected are spotted with dust or other noise, the inspection ability is impaired because the standard image is incomplete. Moreover, even if an image is chosen as a standard image following a manual, there is no assurance that it is truely a standard image. To overcome this shortcoming, according to the prior art, weights are automatically assigned to the feature points selected from a plurality of good-object image sequences, and at the time of feature set selection and matching, a greater influence is exerted upon the feature points of large weights or high reliability, whereas the influence on the feature points of small weights or low reliability is reduced.

FIG. 6 shows examples of images of inspection patterns. As compared with an ideal pattern depicted in FIG. 6A, the actual good object images have superimposed thereon noise components by dusts and spots; for example, as shown in FIGS. 6B through 6D, the actual images are somewhat displaced or rotated relative to the ideal pattern. An image of a no good object shown in FIG. 6E is somewhat flat as compared with the ideal pattern depicted in FIG. 6A; hence, it has superimposed thereon noise and is displaced/rotated relative to the ideal pattern. The good and no good objects must be distinguished under such circumstances. This problem also arises in sorting and recognizing objects through the use of their images.

It is therefore an object of the present invention to provide an inspection/recognition method which obviates the above-described defects of the prior art and ensures distinguishing between good and no good objects or permits correctly sorting or recognizing objects regardless of intensity variations of good objects or standard sample images which are caused by a change in the environment of illumination or in the reflection characteristic of the sample surface or dust and spots on the objects.

SUMMARY OF THE INVENTION

According to the present invention, in an image inspection/recognition method which includes a first step of extracting image features from an input image to obtain a feature image, a second step of quantizing the feature image to obtain a quantized feature image and a third step of obtaining the similarity of or difference between feature points of the quantized feature image through the use of training data of the corresponding features pre-extracted from a plurality of training images, the weights of the feature points are precalculated using feature value histograms at the respective feature points in quantized feature images of the plurality of training images, and the precalculated weights are used to obtain the similarity or difference in the third step as weighted similarity or weighted difference. In the third step, a plurality of different feature images is subjected to feature combination with weights to obtain the weighted similarity or weighted difference.

The weighted similarity in the third step is obtained by the generalized Hough transform operation which votes the weights of feature points into the parameter space. Alternatively, a weighted normalized correlation operation is employed which uses a feature point weight sequence to obtain normalized correlation factors between a feature point value sequence of the feature image obtained from the input image and a feature point value sequence of the feature image from the training image. The weighted difference in the third step is calculated by obtaining a Hough plane by subjecting the quantized feature image to a weighted Hough transform operation which votes the weight of the feature point into the parameter space for each quantization level and by calculating the difference between the Hough plane and a reference Hough plane obtained from the feature image of the training image.

For one feature image, the sum total of the weights of respective feature points is normalized by the number of feature points. When the contrasts of the plurality of training images are larger than a predetermined value, a region feature image is extracted as a feature image in the first step and a normalized correlation operation is performed in the third step. When the contrasts are smaller than the predetermined value, a contour feature image is extracted in the first step and a weighted generalized Hough transform operation is performed in the third step. Alternatively, for pluralities of training images of different categories, such as good and no good objects, the weighted generalized Hough transform operation and the weighted normalized correlation operation are performed, and the distance between similarity distributions in each category; an operation takes place for the category of the larger inter-distribution distance.

In the quantization of the feature image, a quantization width which maximizes the distance between the similarity or difference distributions in each of the categories, such as good and no good objects, is used for the plurality of training images, but this quantization width minimizes mean integrated squared errors of feature value histograms of feature points in feature images of the plurality of training images.

The weight of each feature point is determined in the following manner. That is, a quantized feature images is obtained from a plurality of training image, then a histogram of the feature value at each feature point of the quantized feature image and the weight of the feature point is determined in accordance with the dispersion of the histogram.

In another image inspection/recognition method according to the present invention, as is the case with the above-mentioned method, the quantized feature image of the input image is obtained and the similarity or difference of each feature point of the quantized feature image is obtained using reference data derived from the training image. In this instance, however, a multi-bit plane is generated which is composed of bit planes each corresponding to one of quantization levels of the quantized feature image, then each bit plane is subjected to the generalized Hough transform or Hough transform operation, using the reference data, and the similarity is calculated from the generalized Hough transformed bit plane, or the difference is obtained by calculating the difference between the Hough transformed bit plane and the reference multiple Hough plane. In either case, the weighted similarity calculation or weighted difference operation is performed using the weight assigned to the bit plane.

Pluralities of quantized feature images are obtained from pluralities of training images of a plurality of categories, respectively. The training data in the third step is used to calculate weighted similarities or weighted differences of feature points of feature images of the training images by the same method as that of the calculation used in the third step, and the calculated results are used to obtain similarities or differences of the respective feature images, then these similarities or differences are used to calculate the weights of the features. The thus weighted features are combined, and the similarity or difference in each category and the distance between such similarities or differences in the respective categories are calculated; the combination of the weighted features is changed until the distance satisfies a predetermined condition. In this way, the combination of feature images for use in the calculation in the third step is determined.

Between the similarity or difference in each category and the similarity or difference between the categories in the determined combination of feature images, a threshold value is determined to distinguish between the categories. That is, the threshold value is used to compare the similarity or difference with those obtained in the third step to judge whether the object concerned is good or no good or judge objects for sorting or recognizing them. Moreover, the amount of displacement, rotation or scale change of the origin of the object under inspection, which maximizes or minimizes the weighted similarity or weighted difference obtained in the third step, is calculated and the calculated amount is used as an inspection measure.

The image inspection/recognition apparatus according to the present invention comprises: image memory means for storing an input image; means for extracting image features of the input image and generating a feature image; means for quantizing the feature image; feature image memory means for storing the quantized feature image; reference table memory means for storing feature values, their points and weights as a reference table for each feature image; calculating means for calculating the weighted similarity or difference for each quantized feature image by using the corresponding reference table stored in the reference table memory means; and control means for controlling the respective means.

The reference data generating apparatus for image inspection/recognition use according to the present invention comprises: image memory means for storing an input training image; means for extracting image features from the training image and generating a feature image; means for quantizing the feature image; feature image memory means for storing the quantized feature image; means for obtaining the feature point value distribution from the quantized feature image; a feature point value distribution memory for storing the feature point value distribution for each feature image; means for determining the weight of each feature point on the basis of the feature point value distribution; reference table memory means for storing the feature point and its weight for each feature; weighted similarity (difference) calculating means for obtaining the weighted similarity or difference of the feature image by performing therefor a correlation operation through the use of the weight of the feature point stored in the reference table memory means; similarity (difference) distribution memory means for storing the weighted similarity or difference distribution; means for obtaining the weights of respective features from the similarity or difference distribution corresponding to each category; means for determining a combination of features and for obtaining the distance between the weighted similarity or difference in the category and the weighted similarities or differences between different categories in the combination of features; and means for changing the combination of features until the above-mentioned distance satisfies a predetermined condition and for providing, as reference data, the feature points and their weights in each of the feature images combined.

To obtain feature point weights that are determined on the basis of the dispersion in multiple cell features (multiple resolution features) of a plurality of training image samples, displacements of feature points in training feature image are corrected, then the dispersion in the feature point values is measured and the feature point weights are determined on the basis of the measured results. The feature point weights are calculated for each feature. The feature point weights thus computed are provided as coefficients for use in the weighted similarity calculation and the weighted difference calculation. The distance, which depends on the relationship between the intra- and the inter-variance of the resulting similarity or difference distribution, is used as the weight of each feature, and the features are combined in decreasing order of weight; the features are combined until the distance exceeds a predetermined value or until the relationship of the input image to the standard one is no longer improved.

BRIEF DESCRIPTION OF THE DRAWINGS

FIG. 2A is a diagram showing a standard window in a standard image;

FIG. 2B is a graph showing an example of an intensity pattern in the standard window in FIG. 2A;

FIG. 2C is a diagram showing a search region in an inspected image;

FIG. 2D is a diagram showing an example of the relationship between an intensity pattern in the search region and an intensity pattern in the corresponding standard window;

FIG. 5 is a diagram showing how to vote onto an accumulator array (a parameter space) at the time of performing the generalized Hough transform of an input edge image with respect to a standard edge image;

FIG. 6A is a diagram showing an ideal pattern;

FIGS. 6B through 6D are diagrams showing good object patterns containing a little noise and rotation, respectively, as compared with the ideal pattern of FIG. 6A;

FIG. 6E is a diagram showing a no good object pattern;

FIG. 8 is a diagram for explaining the idea of extracting multiple cell features from an input image;

FIGS. 9A through 9D are diagrams showing images of spatial frequencies different from those of the images shown in FIGS. 6B through 6E, respectively;

FIGS. 10A–10C (hereinafter collectively referred to as "FIG. 10") show examples of training feature corrected images of the image depicted in FIG. 9A;

FIG. 13 is a diagram showing an example of a reference table for a zero-crossing-point image in the first embodiment;

FIG. 14 shows examples of the reference table for use in the case of N features being handled;

FIG. 16 are diagrams showing the registration of feature weights on reference tables in the first embodiment;

FIG. 18 shows examples of reference tables in the second embodiment;

FIG. 19 shows examples of reference tables each attached with a weight value in a header;

DESCRIPTION OF THE PREFERRED EMBODIMENTS

First Embodiment

Figure 7:
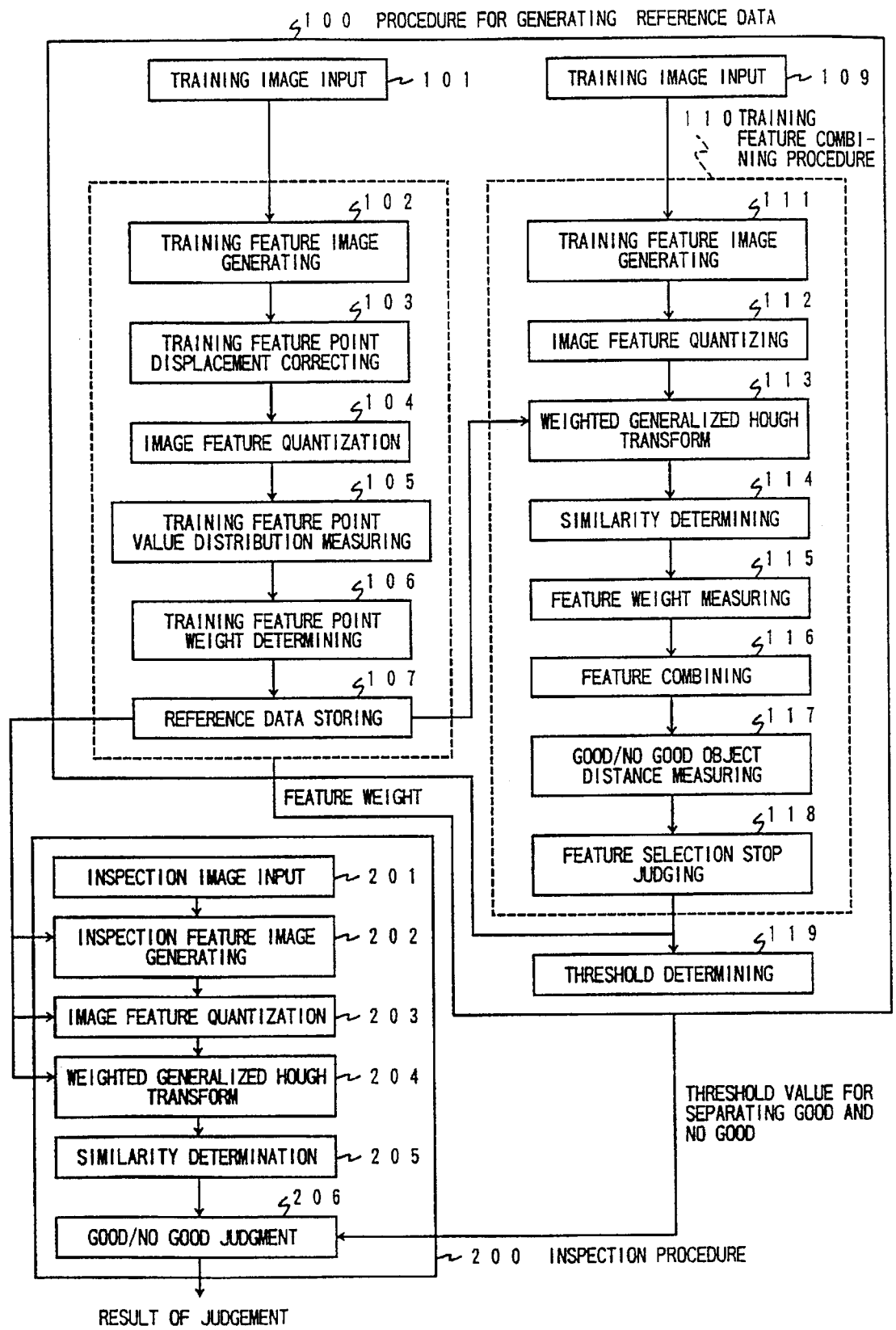
FIG. 7 is a flowchart showing the procedure involved in a first embodiment of this invention method.

FIG. 7 is a flowchart illustrating the procedure involved in the first embodiment of this invention method. The procedure is divided into a procedure 100 for generating reference data for image inspection use and an inspection procedure 200. Now, a weighted similarity calculating operation and a weighted difference calculating operation, which are characteristic of the present invention, will be described concretely. In FIG. 7, the weighted similarity calculation is generalized Hough transform with weights. In the first embodiment, a training feature image generating step 102 through a reference data storing step 107, a weighted generalized Hough transform step 113 and a weighted generalized Hough transform step 204 are particularly characteristic of the present invention.

In a training image input step 101 a plurality of training images of good objects are inputted. The training images are assumed to be inputted after being quantized with multiple gradations (normally a 256-step gradation). In the training feature image generating step 102, training feature images are generated from the inputted training images by multiple cell feature extraction processing. The multiple cell feature extraction scheme is shown in FIG. 8. That is, four basic representations of the inputted training image, such as an intensity distribution 41, a direction distribution 42, an edge density distribution 43 and an edge configuration distribution 44, are noted. From the intensity distribution 41 is extracted an intensity variance or similar intensity statistics image 45 by localized filtering. From the direction distribution 42 are extracted a curvature image (an edge inflectivity image) 46 and a bar feature image 47 indicating parallelism. From the edge density image 43 is extracted a complexity image 48 indicating the number of radial scanning lines crossing an edge. From the edge configuration distribution 44 are extracted an extent image 49 indicating the distances (radial distances) to the points where radial scanning lines meet an edge for the first time and a blob feature image 50 indicating the "circularity" which is computed from the diagonal distance ratio between the respective radial distances. The methods for extracting these feature images 45 to 50 are disclosed, for example, in Japanese Pat. Laid-Open Gazette No. 213085/88 entitled "Image Feature Extracting Operation System," Japanese Pat. Laid-Open Gazette No. 213093/87 entitled "Image Feature Extracting Method," and Japanese Pat. Laid-Open Gazette No. 226785/87 entitled "Image Feature Extracting Apparatus." The feature images 45 to 50 are divided into region feature images which reflect properties of a region, such as the intensity statistics, the complexity and the extent (which region is a localized region to be processed by localized filtering, not a region resulting from segmentation), and contour feature images which reflect such properties of a contour as the edge and the curvature. Based on differences in the spatial frequency for filtering and in resolution (the difference in the cell representing a pattern) in addition to the above-mentioned feature set difference in the feature images including original intensity and edge images, new feature images are generated for the above-noted features.

Now, consider the case of extracting zero-crossing-point images which are contour feature images, from the inspected pattern images shown in FIG. 6. Such a zero-crossing-point image is obtained by calculating a quadratic differential image through the convolution of the original image and a Laplacian gaussian filter and by calculating zero crossing points of the quadratic differential value (corresponding to inflection points where the gray-scaled value of the original image changes). The Laplacian gaussian filter is defined by a quadratic differential G" of $(G(x,y,\sigma)=(1/(2\pi\sigma^2))\exp(-(x^2+y^2)/(2\sigma^2)))$; the $\sigma$ is changed and zero crossing points are extracted for such different $\sigma$.

FIGS. 9A through 9D show zero-crossing-point images extracted from the images of FIGS. 6B through 6E, respectively. The uppermost feature images in FIG. 9 are images obtained when the $\sigma$ is small, in which case the spatial frequency is high and a fine contour structure can be extracted but noise is also detected. The lowermost feature images are images obtained when the $\sigma$ is large, in which case the spatial frequency is low and noise is not detected but only a rough contour structure can be obtained.

Such multiple resolution cells (multiple cell feature) are collectively managed as a pyramidal multi-layer feature plane 51 (FIG. 8). By extracting the multiple cell feature which is provided on the basis of the four basic representations (41 to 44 in FIG. 8) and the differences in the spatial frequency and in the resolution, it is possible to distinguish between good and no good objects even if noise is present. In the training feature image generating step 102 in FIG. 7, part of the multiple cell feature, which is considered to be effective in terms of efficiency of the system, is usually extracted taking into account the object under inspection.

Next, in the training feature point displacement correcting step 103, the plurality of training feature images obtained in step 102 are corrected for displacement/rotation/scale. The feature point mentioned herein is a pixel point that plainly indicates the property of the object in the feature image; for example, in the zero-crossing-point image, the pixel of a value 1 is the feature point. The displacement/rotation/scale correction is a mere correction in terms of position, and hence can be achieved, for example, by calculating the shift of the feature point through fitting by least squared error estimation and then performing an affin transform to correct the shift amount. Various known methods can be employed but a simple method is preferable.

Figure 1A:
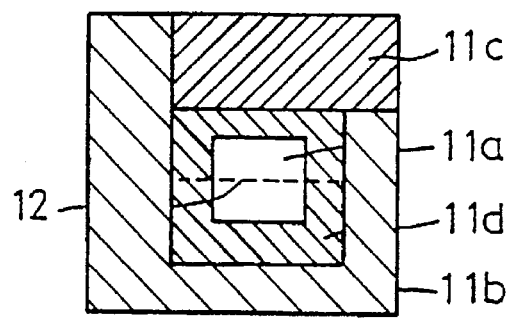
FIG. 1A is a diagram showing an example of an inspected image.
Figure 1B:
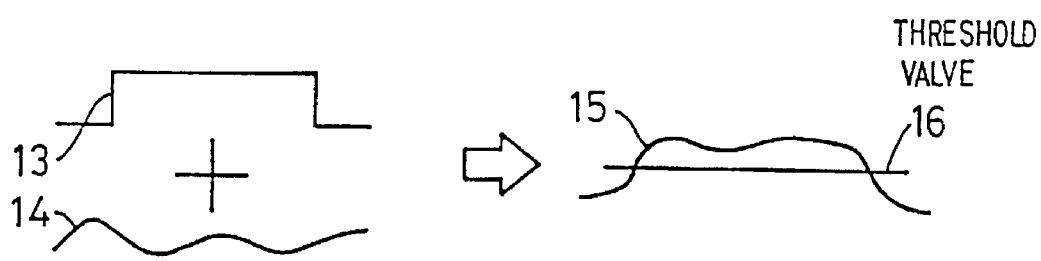
FIG. 1B shows an ideal intensity variation curve 13 and an example of the actual intensity variation curve on the solid line 12 in FIG. 1A and their combined curve 15.
Figure 1C:
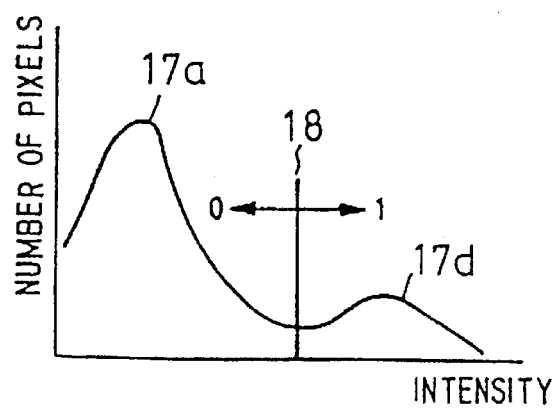
FIG. 1C is a graph showing an example of an intensity histogram in a region 11a in FIG. 1A.
Figure 1D:
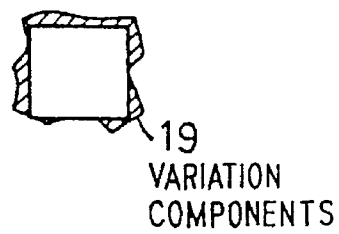
FIG. 1D is a diagram showing the results of extraction of the region 11a by a conventional inspection method.
Figure 3:
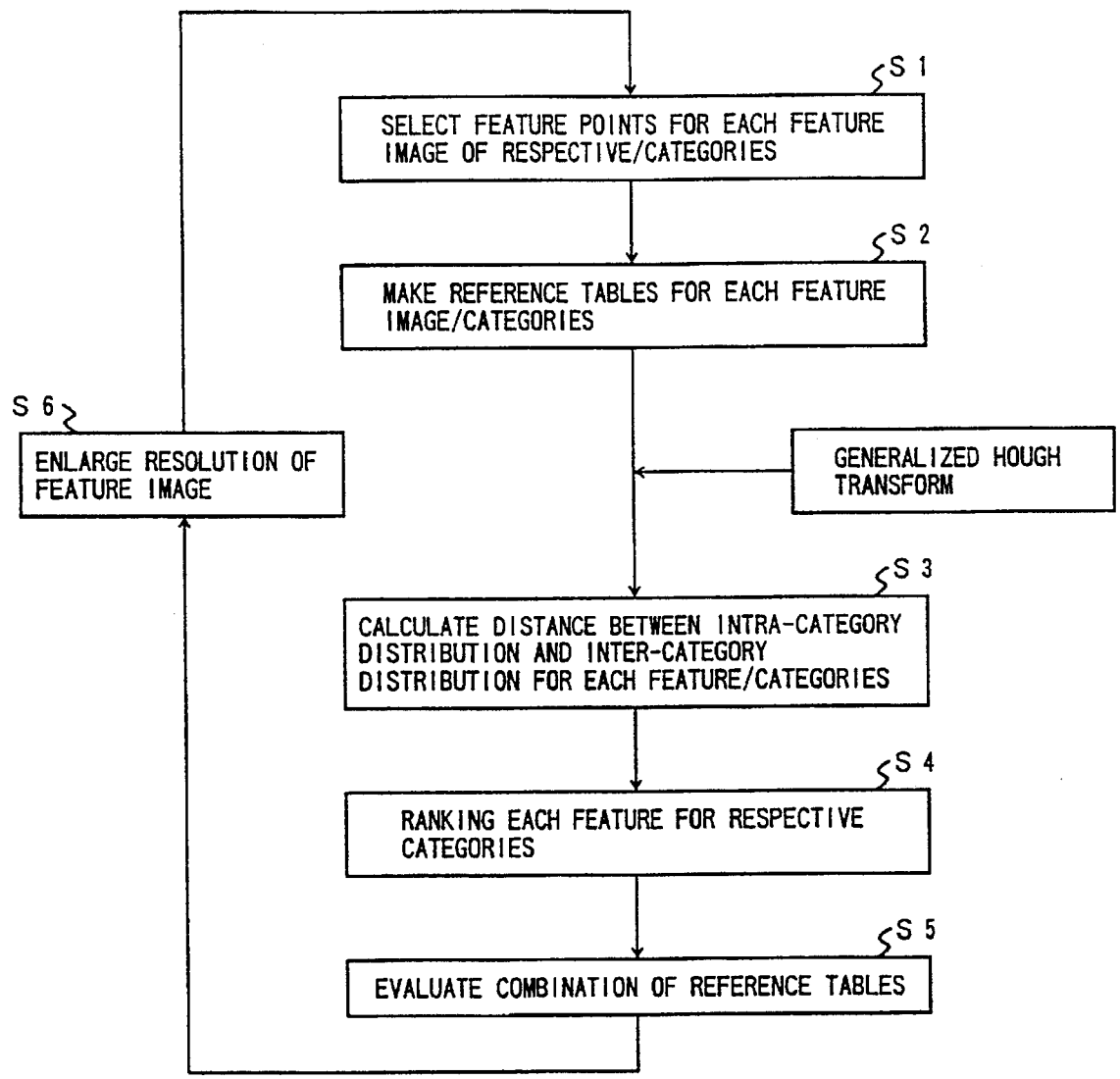
FIG. 3 is a flowchart showing the procedure in a conventional image inspection method using a generalized Hough transform scheme.

In this embodiment, a method using the generalized Hough transform, which is matching processing, will be described. Any one of the training feature images is used as a standard feature image, and the positions of feature points in the object (the object in the training image) and the origin of the object (the reference point) to be corrected are specified. To minimize correction error, it is preferable that the position of the origin of the object to be corrected be the center of the object. As in step S2 in FIG. 3, the positions of the feature points from the origin of the object in the standard feature image are stored in a reference table, using their feature values as indexes. This reference table is used to perform the generalized Hough transform of other training feature images. In this instance, since a feature point weight w is not yet determined in the weighted generalized Hough transform described later, the value w is made common to the feature points. That is, the increment value of an accumulation histogram is not the value w but one as in the conventional generalized Hough transform.

Figure 4:
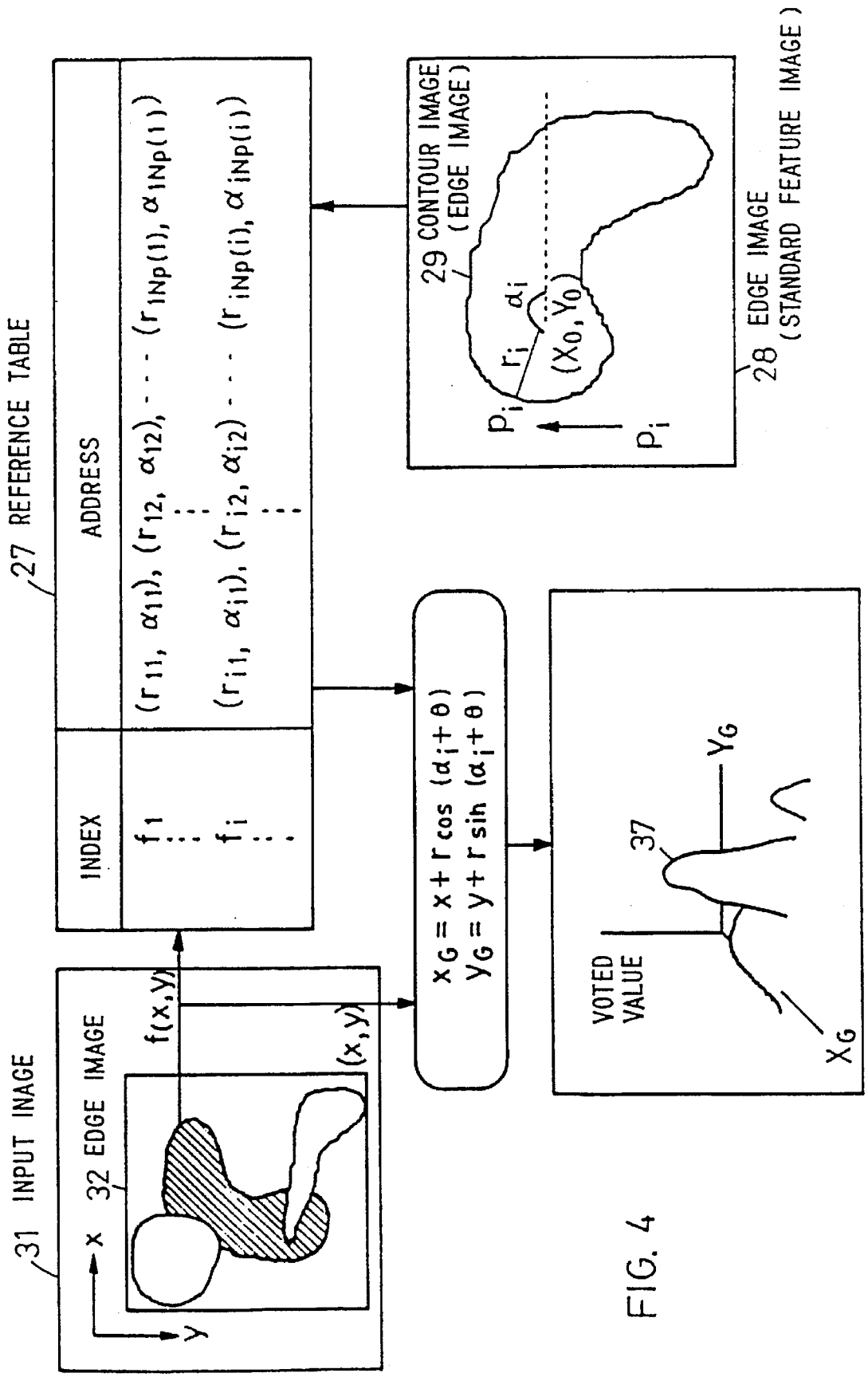
FIG. 4 shows diagrams for explaining a conventional generalized Hough transform.

In the generalized Hough transform, when each feature point value in the training feature image matches the corresponding feature value index on the reference table, an address translation is performed using the position of the feature point stored corresponding to the matched feature value index as is the case with FIG. 4, then voting into the parameter space of the position/rotation angle of the origin of the object takes place and changes in position/rotation angle/scale of the origin of the object is calculated on the decision by majority principle. The thus determined position/rotation angle/scale changes of the origin of the object are used to correct the training feature image through affin transform for its amounts of shift from the standard feature image in terms of position, rotation angle and scale. As the result of this, a corrected training feature image is calculated. In FIGS. 10A to 10C there are shown images obtained by correcting the training feature images of high, intermediate and low spatial frequencies shown in FIG. 9A to 9D, respectively.

When the feature image has a multiple gradation as a feature, the image feature is quantized using a preferable quantization width in the image feature quantization step 104 as described later. Letting the image feature be represented by F(x,y), the quantized image feature by G(x,y) and the number of quantization levels by $I_q$, $$G(x,y)=((F(x,y)-F_{min})/R) \times I_q$$

where, $$0 \leq G(x,y) \leq I_q - 1$$

In the above, $F_{min}$ is the minimum value of the image feature F and R is its dynamic range. The quantization width is defined as $R/I_q$. In this quantization, it is preferable to use a quantization width which minimizes the distance between the similarity distribution of a good object (the intra-category maximum frequency distribution referred to previously in respect to FIG. 3) and the similarity distribution of a no good object (the inter-category maximum frequency distribution). If the quantization width is not optimal, the hit rate of the generalized Hough transform lowers, resulting in the inspection ability being impaired. The optimum quantization width can accurately be calculated by evaluating the distance between the above-mentioned similarity distributions, but too much time is needed to seek the optimum value by changing the quantization width little by little. Hence, it is desirable, in terms of the efficiency of the training system, to roughly limit the range of the optimum quantization width on the basis of the distribution of an image feature of the good object without the need of calculating the distance between the similarity distributions.

A mean integrated squared error of a feature value histogram of the training image of the good object is noted as a measure for evaluating the range of the optimum quantization width. The quantization width that minimizes this error is used as a substantially optimum quantization width and the quantization width that minimizes the distance between the similarity distributions is sought after in the range of presence of the substantially optimum quantization width.

The mean integrated square error of the feature value histogram is formulated by the following expression.

$$\text{error}(I_q) = \sum_{k=1}^{I_q} (H_{ideal}(k) - H(k))^2$$

where $H(k)$ is the feature value histogram, $k=1, \ldots, I_q$, and $H_{ideal}(k)$ is an ideal feature value histogram. The thus defined mean integrated squared error is minimized. Since the ideal feature value histogram $H_{ideal}(k)$ is unknown, an expected value of the above error, that is, the mean integrated squared error, is calculated by the following equation through the use of a maximum likelihood estimation method.

$$E_{error}(I_q) = (I_q/(nR)) \left[ 1 - ((n+1)/(n-1)) \left( \sum_{k=1}^{I_q} H(k)^2/n - 1 \right) \right]$$

where n is the sum total of frequency values of the feature value histogram. By calculating the number of quantization levels $I_q$ that minimizes the error $E_{error}(I_q)$, it is possible to limit the range of the presence of the optimum number of quantization levels (the quantization width).

By setting a simpler measure $$I_q^* \leq (2n)^{1/3}$$

it is also possible to define the range of the optimum number of quantization levels (the quantization width).

Figure 11:
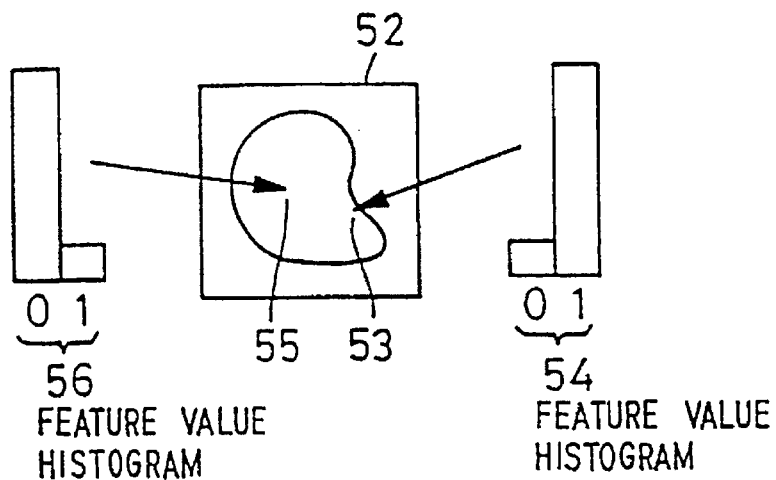
FIG. 11 is a diagram showing an example of the feature point value distribution in a training zero-crossing-point image.

Next, in the training feature point value distribution measuring step 105, a feature value histogram is generated, for each feature point, from a sequence of corrected training feature images (quantized images) stored for each feature. In this case, since a displacement correction error is usually present, the feature value histogram is produced covering pixel surrounding the noted feature point in correspondence with a permitted correction error. It is also possible to divide the corrected feature image into image blocks overlapping in correspondence with the permitted correction error and produce the histogram in each block. In FIG. 11 there are shown feature value histograms derived from a sequence of zero-crossing-point feature images (1 at the zero crossing point and 0 at other points) 52. A feature value histogram 54 near a boundary 53 is high in the frequency of the zero crossing point 1, indicating a good likelihood of the zero crossing point. On the other hand, a feature value histogram 56 at a portion 55 appreciably apart from the boundary is low in the frequency of the zero crossing point 1, indicating a small likelihood of the zero crossing point.

In the training feature point weight determining step 106, the weight of each feature point, which indicates the magnitude of its feature, is set taking into account the state of the training feature point value histogram distribution for the feature point. Now, let the number of training samples be represented by M. In the case of FIG. 11, the weight is determined in proportion to the magnitude of the frequency ratio R (=frequency/M) of zero crossing points (the points where the value of the zero-crossing-point image is 1). Since the points where the value is 0 are not zero crossing points, they are not weighted. It is preferable, from the viewpoint of computation cost, to exclude the points of small weights at this stage. For example, when the frequency ratio R is above ½ or so, a decrease in the frequency ratio is considered to have been caused by a quantized error; hence, the feature point can be regarded as a zero crossing point. When the frequency ratio is extremely low, it is considered to have been caused by a noise component and the feature point need not be regarded as a zero crossing point. In this way, the feature points are subjected to thresholding with the frequency ratio R, thereby eliminating points that are likely to be noise. The remaining zero crossing points are weighted by the frequency ratio R. The weight distribution of each of the remaining zero crossing points is used to assign a weight to each point (a feature point) of a standard zero crossing point set (a standard feature point set). In a special case, it is possible to assign the same weight to each of the remaining zero crossing points. The standard zero crossing point set can be obtained by the methods mentioned below.

1) Detect peaks of the weight distributions of the zero crossing points and handle them newly as the standard zero crossing point set.

2) Note the commonest one of corrected zero-crossing-point training feature images (corrected zero-crossing-point feature images) and use zero crossing points in the noted image as the standard zero crossing point set.

In either case, each zero crossing point of the standard zero crossing point set is assigned a weight value $w_i$ (where $i=1, \ldots, N_p$) of the corresponding zero crossing point weight distribution. Each weight value is normalized so that the sum total of the weights of the zero crossing points in the standard zero crossing point set becomes equal to the number $N_p$ of standard zero crossing points. Consequently, assuming that the weights are the same, each weight is $1/N_p$. In this way, the weights of the feature points are generalized regardless of kind.

Figures 12A, 12B:
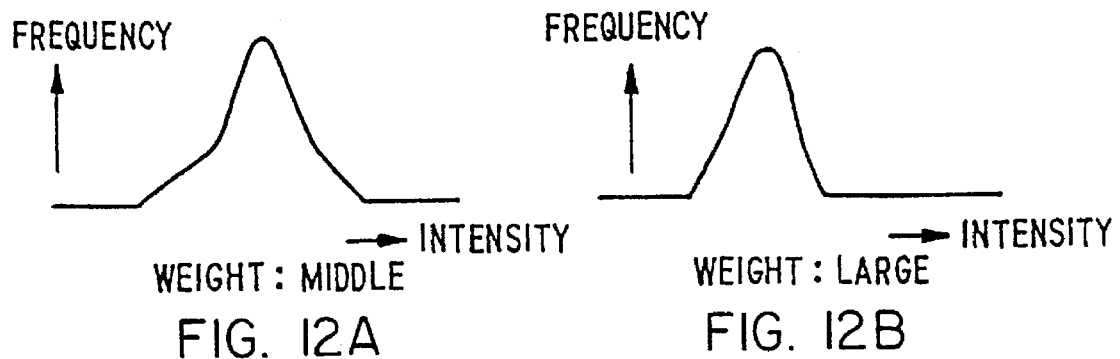
FIG. 12A through 12D show examples of the training feature point value distribution in an intensity image.
Figures 12C, 12D:
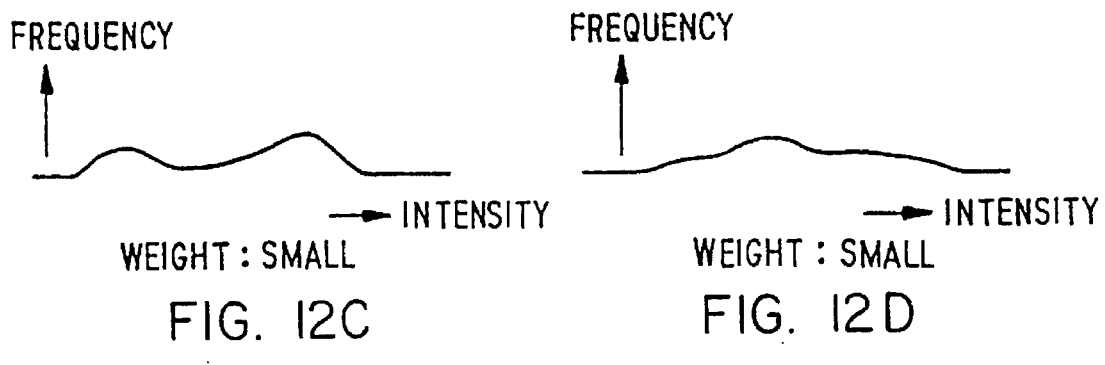

Suppose that the feature value distributions in an intensity image are such as shown in FIGS. 12A through 12D. The more the distribution concentrates on a certain feature value (intensity) as shown in FIG. 12B, that is, the smaller the dispersion in the distribution, the larger the weight. In this instance, the frequency ratio R, which is obtained by dividing the maximum frequency by the number M of training samples, can be regarded as a measure of weight. It is also possible to set the weight in inverse proportion to the magnitude of the variance of the distribution. Then, as is the case with the above, the feature points are subjected to thresholding with the frequency ratio R or the value of the variance of distribution to remove points that are likely to be noise. A set of remaining feature points is used as a standard feature point set. The feature value of each feature point in the standard feature point set is set to a value that provides the maximum frequency or the mean of the distribution, for instance. The weight value $w_i$ (where $i=1, \ldots, N_p$) for the standard feature point set is normalized so that the sum total of such weight values becomes equal to the value $N_p$. In a special case, it is also possible to assign the same weight to each of the remaining feature points so that the sum of the weights becomes equal to the value $N_p$.

Moreover, background images or the like, which are not to be weighted, can be eliminated by directly specifying such feature points on the display screen by an operator through the use of a mouse, cursor or similar means. Alternatively, such unnecessary areas on the inspected image can be removed by reading out CAD (Computer Aid Design) data of the object under inspection. By determining the weights of the training feature points while giving priority to the feature points specified by an operator on the screen or by CAD data, the feature points can be weighted more minutely.

In the training data storing step 107 in FIG. 7, the origin $C_G$ $(x_G, y_G)$ of the object to be calculated in the feature image is determined and its positional relationship to each feature point $P_i$ obtained in step 105 is represented using polar coordinates $(\gamma_i, \alpha_i)$ (where i=1, . . . , $N_p$) as depicted in FIG. 13. Then, the polar coordinates $(\gamma_i, \alpha_i)$ of the feature point $P_i$ having the feature value obtained in step 105 or 106 and the weight $w_i$ of the feature point $P_i$ obtained in step 106 are stored in a reference table 61, using the feature value as an index. In FIG. 13 there are shown examples of configurations of reference tables 61a, 61b and 61c corresponding to zero-crossing-point images 52 of high, intermediate and low spatial frequencies, respectively. In the zero-crossing-point feature image 52 the feature value of the feature point is only 1; therefore, the index column is omitted in each of the tables 61a, 61b and 61c.

In FIG. 14 there are shown examples of reference tables 61 for N feature images. For a feature image f(1), feature values $I_0(1), I_1(1), \ldots$ are used as indexes to store position information and weight information of feature points having the feature values, $(\gamma_{i0}(1), \alpha_{i0}(1), w_{i0}(1)$ (where i=1, . . . , $N_{p0}(1))$ and $(\gamma_{i1}(1), \alpha_{i1}(1), w_{i1}(1)$ (where i=1, . . . , $N_{p1}(1))$ . . .), in the reference table $61_1$. For the other feature images, too, position information and weight information $(\gamma_{i0}(k), \alpha_{i0}(k), w_{i0}(k), (\gamma_{i1}(k), \alpha_{i1}(k), w_{i1}(k), \ldots$ are similarly stored in reference tables $61_k$ (where k=1, . . . , N), respectively, using feature values $I_0(k), I_1(k), \ldots$ as indexes. Next, the weight of each feature image, $W_k$ (where k=1, . . . , N), is determined and feature combining processing is performed to determine the optimum combination of features. The feature image weighting in this feature combining processing is described in detail in Japanese Pat. Laid-Open Gazette No. 175885/92 entitled "Image Feature Selection Method in Generalized Hough Transform." In this embodiment, the feature point weight (an analog value) is determined on the basis of a plurality of images as referred to previously and the weight is extended for application to the generalized Hough transform in the feature image weighting.

To perform this, training images of both good and no good objects are inputted in a training image input step 109 in FIG. 7. In a training feature combining processing 110, training feature images of good and no good objects are formed in a training feature image forming step 111 by the multiple cell extraction method as in step 102 (FIG. 8), and in an image feature quantizing calculation step 112, quantized training feature images are obtained from the above feature images. The quantization width used in this quantization is the same as that used in step 104.

In the weighted generalized Hough transform step 113, weighted generalized Hough transform processing is performed for each feature point (x,y) of the quantized training feature image. In the good object image already corrected for displacement, only sequences of feature points in a circumscribed rectangle of standard object are subjected to the weighted generalized Hough transform processing. The rotation angle θ and the scale change ratio s may be fixedly set to "0" and "1," respectively. For a good object image not corrected for displacement and a no good object image, sequences of feature points to be processed are all feature points in the training images and their rotation angles and scale change ratios are set free. The images of both good and no good objects may be corrected for displacement, but in general, in the no good object image and in images with noise superimposed therein, half size feature images such as the edge image and the zero-crossing-point image are readily affected by noise and their image quality is seriously degraded by the displacement correction, besides the displacement correction ability differs with the kind of image feature; hence, training with the displacement correction is difficult in general. For this reason, no displacement correction is performed in advance in this embodiment. In the generalized Hough transform, however, matching for the displacement automatically takes place as described previously.

A general expression of the weighted generalized Hough transform will be described below.

When the feature value of each point (x,y) in the feature image of the image inputted in step 109 matches the feature value index stored in the reference table 61, the feature location $(\gamma, \alpha)$ stored in the feature value index is used to perform the following address translation.

$$x'=x+s \times r \times \cos(\theta+\alpha)$$
$$y'=y+s \times r \times \sin(\theta+\alpha) \quad (2)$$

where x', y' is the predicted location of the origin of the object (the reference point) in the training image, θ a predicted rotation angle and s a predicted scale. Only the weight w of each feature point is accumulated at the address of a parameter space (x', y', θ, s) formed by these predicted parameters. That is, letting A(x', y' θ, s) represent an accumulated histogram in the parameter space (x', y' θ, s), $$A(x', y', \theta, s) := A(x', y', \theta, s)+w \quad (3)$$

The above processing is repeatedly carried out while slightly changing predicted variation ranges for the rotation angle θ and the scale change ratio s, for example, a ±10° variation range dependent upon the accuracy of the jig used in the fabrication of the object in the image, and a ±10% scale variation range. Normally, in many cases, the scale change ratio s is fixed and an accumulated histogram A(x', y' θ) is formed in a parameter space (x', y' θ).

In a similarity determining step 114, an optimum origin location/rotation angle/scale parameter (x*, y*, θ*, s*) is calculated which provides the maximum frequency for the accumulated histogram A(x', y' θ, s) calculated by the above-mentioned weighted generalized Hough transform processing; the maximum frequency Hm is normalized with the feature point number $N_p$ to obtain similarity S.

In a feature weight measuring step 115, for N feature images of each of good and no good objects, the weighted generalized Hough transform processing is performed and similarity is determined. That is, letting the number of sample images of the good object and the number of sample images of the no good object be represented by $M_{ok}$ and $M_{ng}$, respectively, the similarity to a k-th feature image is expressed by a similarity sequence $S_{ok}(k,m)$ (where m=1), .

Figure 15:
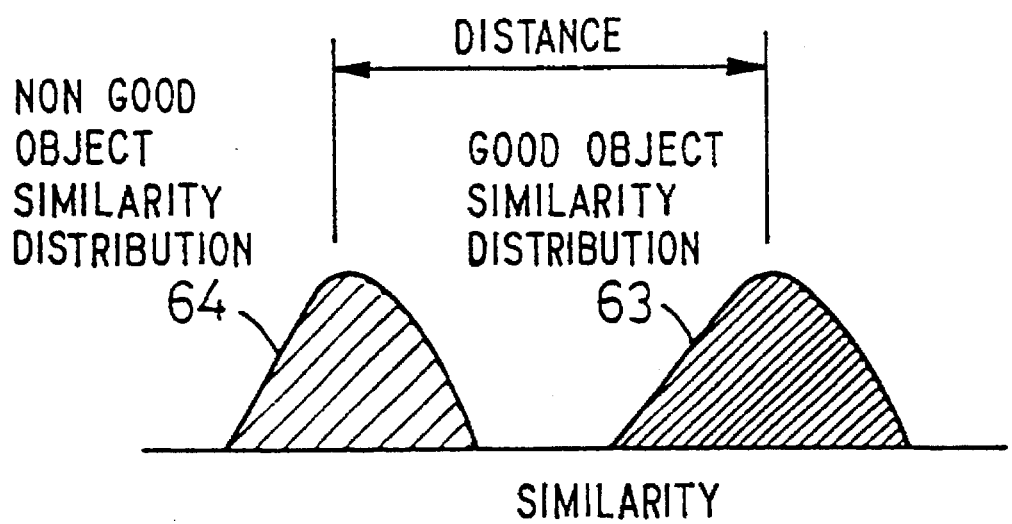
FIG. 15 is a diagram showing the concept of the difference (distance) between a no good object similarity distribution (the inter-category similarity distribution) and the good object similarity distribution (the intra-category similarity distribution)

..., $M_{ok}$ in the case of the good object and by a similarity sequence $S_{ng}(k, m)$ (where m=1), ..., $M_{ng}$ in the case of the no good object. In this way, the similarity distribution of the good object and the similarity distribution of the no good object are generated for the k-th feature image as indicated by 63 and 64 in FIG. 15. The weight for the k-th feature image is calculated depending upon the difference between the good object similarity distribution 63 and the no good object similarity distribution 64. When the number of samples is large, the mean and variance of either distribution are used to calculate the above-mentioned difference in terms of a Battacharyya distance or similar distance measure. Since it is also expected that the number of training samples is small, a simple statistic measure is employed; for example, the distance W(k) between the worst value in the good object, i.e. the value in the good object which is the farthest from the standard feature image, and the best value in the no good object, i.e. the value in the no good object which is the closest to the standard feature image, is used as the difference between the both distribution, and this difference is used as a weighting factor. That is, the weighting factor W(k) for the k-th feature image is given by the following equation.

$$W(k)=\text{MIN}\ (S_{ok}(k,m)) -\text{MAX}\ (S_{ng}(k,m))+c \qquad (4)$$

where c is a constant for adjustment that provides $W(k) \geq 0$. The weighting factors $W(1), ..., W(N)$ are stored in headers of respective features in the reference data tables $61_1$ to $61_N$ of FIG. 14 as shown in FIG. 16.

In a feature combining step 116, the features are combined in descending order of the weighting factor W(k). At first, the weighting factors W(k) are sorted in decreasing order of magnitude. Then, the feature are combined, and possible methods for combining them are OR coupling and AND coupling. In the case of AND coupling, only when the corresponding feature points on the combined feature images have the same value, an increment is made in the weighted generalized Hough transform, that is, a weighted accumulation is carried out for the feature point concerned. The feature point weight w that is accumulated in this case is, for example, a value averaged among the features concerned. In the case of OR coupling, letting the accumulation histogram of the generalized Hough transform for the k-th feature image be represented by $A(k|x', y', \theta, s)$ and assuming that the feature images rearranged in descending order of the magnitude of the weighting factor are combined up to high order $N_c$ ones, the following weighted accumulation histogram is calculated.

$$Acc(N_c|x', y', \theta, s) = \Sigma W(k)\ A(k|x', y', \theta, s) \qquad (5)$$

where $\Sigma$ is the total sum of the $N_c$ features. In this instance, the weighted accumulation of the accumulation histogram is not executed for all values in the parameter space but is executed only for values close to the peak value—this is intended to increase efficiency.

In a good/no good object distance measuring step 117, the degree of separation of the above-noted combined features between good and no good objects (the distance between good and no good objects) is measured. The maximum frequency value $S(N_c)$ is calculated for the weighted accumulation histogram $Acc(N_c|x', y', \theta, s)$ and it is normalized with the number of standard feature points, $N_p(N_c)$, that is, the sum of the numbers of feature points in the reference tables of the combined features (the number of reference feature points are also rearranged in descending order of the feature weighting factor) to obtain a similarity $S(N_c)$. That is, $$S(N_c):\ = S(N_c)/(N_p(N_c)\ \Sigma W\ (k)) \qquad (6)$$

where $\Sigma$ is the total sum of the $N_c$ features. Now, letting the normalized similarity distribution for a good object sample be represented by $S_{ok}(N_c, m)$, m=1, ..., $M_{ok}$ and the normalized similarity distribution for a no good object sample be represented by $S_{ng}(N_c, m)$, m=1, ..., $M_{ng}$, the difference $D(N_c)$ between both distributions is calculated using, as a simple statistic measure, the difference between the minimum value of the distribution $S_{ok}(N_c, m)$ and the maximum value of the distribution $S_{ng}(N_c, m)$. That is, $$D(N_c)=\text{MIN}\ (S_{ok}(N_c, m)) -\text{MAX}\ (S_{ng}(N_c, m)) \qquad (7)$$

In a feature selection stop judging step 118, a check is made to see if the two distributions stay apart with allowance, that is, if the following condition for stopping feature combination holds.

$$D(N_c)-\epsilon > 0 \qquad (8)$$

In the above, $\epsilon (\geq 0)$ is a parameter for adjusting the allowance. Though dependent upon each image being handled, the parameter $\epsilon$ is set to a value that stabilizes the system, by repeatedly evaluating the value while increasing the parameter little by little. The value that stabilizes the system is usually about 0.1 or 0.2.

When the condition for stopping feature combination holds, a threshold value $T_h$ for separating good and no good objects is determined in a threshold determining step 119. According to the severity of judgement, the threshold value $T_h$ may be set to the limit value of a good object or a value intermediate between the limit value $\text{MIN}(S_{ok}(N_c, m))$ of a good object and the limit value $\text{MAX}(S_{ng}(N_c, m))$ of a no good object. On the other hand, if the condition for stopping feature combination does not hold, then the process goes back to the feature combining step 116, in which the number of features combined, $N_c$, is incremented by one and the feature combination processing is performed.

Next, an inspection procedure 200 will be described.

In an inspection image input step 201, an inspection image is inputted. In an inspected feature image forming step 202, a multiple cell feature extracting calculation is conducted to form an inspected feature image. This inspected feature is provided for the feature combination at the time when the condition for stopping feature combination (Eq. 8) is met in the training procedure. In an image feature quantization step 203, feature image quantization processing is performed for each feature, using the optimum number of quantization levels calculated in the training procedure. In the weighted generalized Hough transform step 204, the inspected quantized feature images thus calculated are each subjected to the weighted generalized Hough transform processing (Eq. (3)), using the reference table 61 wherein there are stored the feature combination and feature point weight information determined in the training procedure.

In a similarity determination step 205, the processing of Eqs. (5) and (6) is carried out to calculate an inspection similarity $S_t$, using the number of features combined $N_c$ determined in the training procedure.

In a good/no good judgement step 206, the inspected objects are judged as being good or no good, depending upon whether $S_t \geq T_h$ or $S_t < T_h$.

Second Embodiment

Figure 17:
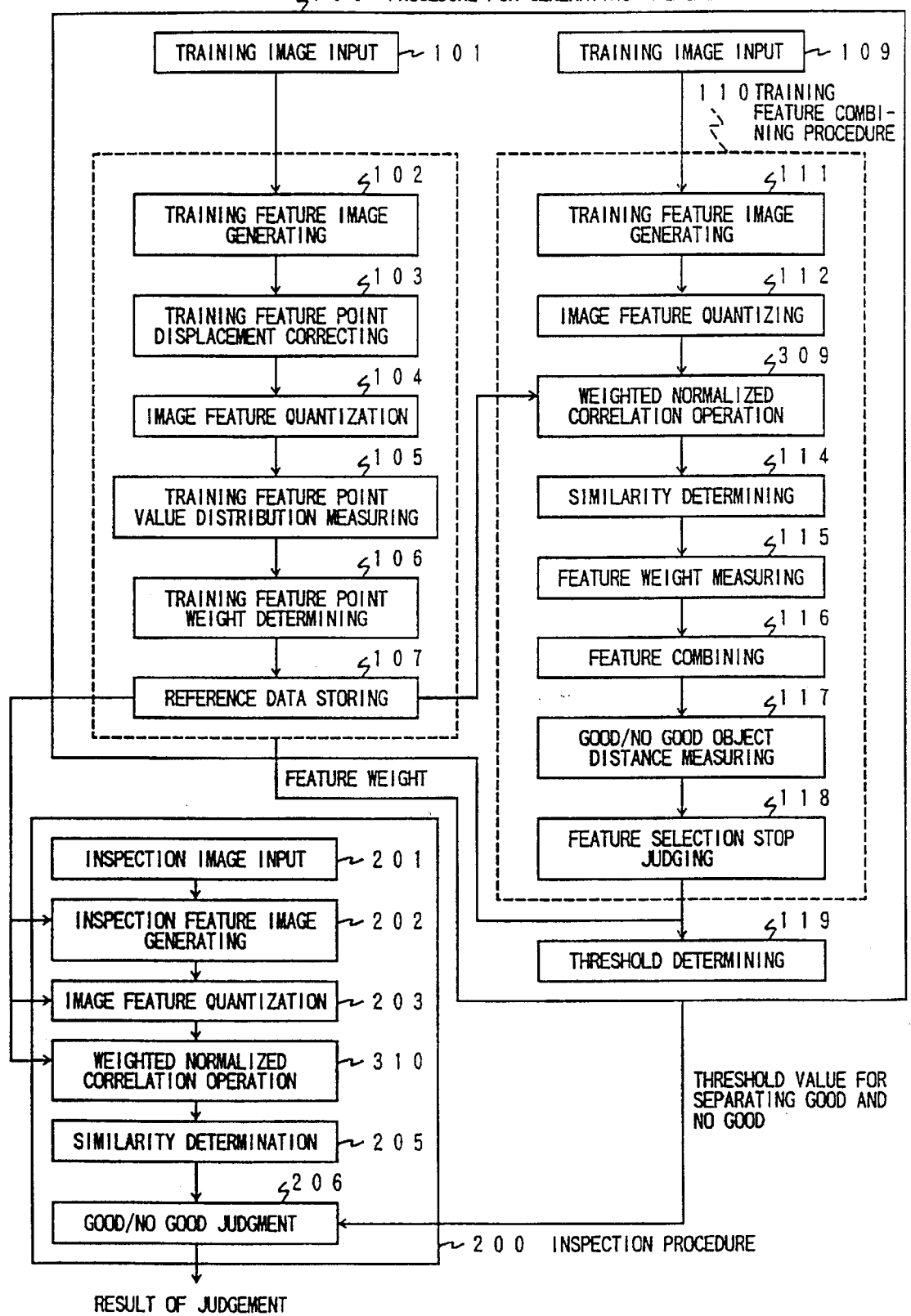
FIG. 17 is a flowchart showing the procedure involved in a second embodiment of the present invention.

Next, a description will be given, with reference to FIG. 17, of a second embodiment of this invention method. In FIG. 17, the steps corresponding to those in FIG. 7 are identified by the same reference numerals, and attention will be focused on steps different from those in the first embodiment.

In step 101 a training image of a good object is inputted. In the training feature image forming step 102, a training feature image is formed as in the processing of FIG. 7, and it is corrected in terms of position, rotation angle and scale in the training feature point displacement correction step 103. This correction may also employ the weighted normalized correlation calculation described later. Since the feature point weight w is not yet determined, it is held common to all feature points in the weighted normalized correlation calculation; for example, $w_i(k)=1$, where $i=1, \ldots, N_p(k)$. The displacement-corrected training feature image is quantized using the optimum quantization width as in step 104 in FIG. 7.

Furthermore, feature value histograms of respective feature points are generated and their distribution is used to determine the feature point weights.

The reference table 71, in which training data is stored in the training data storing step 107, differs in configuration from the reference table used in the first embodiment. For example, as shown in FIG. 18, a sequence of x-y coordinate value, feature value f and feature point weight w of each feature point in each feature image is stored. That is, for a first feature image f(1), a sequence of data $((x_i(1), y_i(1), f_i(1), w_i(1)), i=1, \ldots, N_p(1))$ is stored in a reference table $71_1$ for each feature point, and for an N-th feature image f(N), a sequence of data $((x_i(N), y_i(N), f_i(N), w_i(N)), i=1, \ldots, N_p(N))$ is stored in a reference table $71_N$ for each feature point.

The training feature image forming step 111 in the training feature combination processing procedure 110 is the same as in the first embodiment. As regards the feature images already corrected for displacement, only sequences of feature points in a circumscribed rectangle of standard object are subjected to the weighted generalized Hough transform processing. In this case, the rotation angle θ and the scale change ratio s may be fixedly set to "0" and "1," respectively. For a good object image not corrected for displacement and a no good object image, sequences of feature points to be processed are all feature points in the training images and their rotation angles and scale change ratios are set free. The images of both good and no good images may be corrected for displacement, but in the no good object image and in images with noise superimposed thereon, the displacement correction ability generally differs with the kinds of image features; hence, it is necessary to select features, taking a displacement correction error into account. For this reason, no displacement correction is performed in this embodiment.

The training feature image formed in step 111 is quantized with the quantization width used in step 104, and the quantized feature image is subjected to a weighted normalized correlation operation in step 309. In step 309, the following processing is performed for each rotation angle θ, each scale change ratio s and each point (x,y). Letting each point (x', y') represent a predicted location of the origin of the object, the weighted normalized correlation operation is performed between a sequence of training feature point values $f_i(k), i=1, \ldots, N_p(k), k=1, \ldots, N$ (a sequence of feature point weights: $w_i(k), i=1, \ldots, N_p(k)$) and image feature values $g_i(k), i=1, \ldots, N_p(k)$ at the same relative positions $(x'+x_i(k), y'+y_i(k))$ of good and no good object sample images as the training feature points. In this case, the $x_i(k), y_i(k)$ address of the training feature point value used is an address transformed (affine transformed) for the predicted values of the rotation angle θ and the scale s. Letting a weighted normalized correlation factor for a predicted parameter (x', y', θ, s) be represented by $$A(klx', y', \theta, s) = \Sigma (w_i(k) (f_i(k) - f'_m(k)) \times (g_i(k) - g'_m(k)))/((\Sigma w_i(k)) (\Sigma (f_i(k) - f'_m(k))^2 \times \Sigma (g_i(k) - g'_m(k))^2)^{1/2} \quad (9)$$

where $f'_m(k)$ and $g'_m(k)$ are mean values of feature value sequences, which are given as follows:

$$f'_m(k)=(1/N_p(k)) \Sigma f_i(k)$$
$$g'_m(k)=(1/N_p(k)) \Sigma g_i(k) \quad (10)$$

In the above, $\Sigma$ is the summation from i=1 to $N_p(k)$. The calculated parameter $A(klx', y', \theta, s)$ is an accumulation histogram for the parameter space (x', y', θ, s) in the weighted generalized Hough transform, but in the case of the weighted normalized correlation, it is the normalized correlation factor distribution for the parameter space (x', y', θ, s).

The subsequent processing of the parameter $A(klx', y', \theta, s)$ is the same as in the first embodiment.

In the feature weight measuring step 115, weight values for the feature images are stored in the same manner as in the first embodiment; as shown in FIG. 19, the weight value W(k) is stored in the header of each feature in the reference table 71 of FIG. 18.

The inspection procedure 200 is also identical with that in the first embodiment except for the calculation of the weighted normalized correlation factor by Eq. (9) in a weighted normalized correlation operation step 310 instead of the weighted generalized Hough transform step 204 in the first embodiment.

Figure 29A:
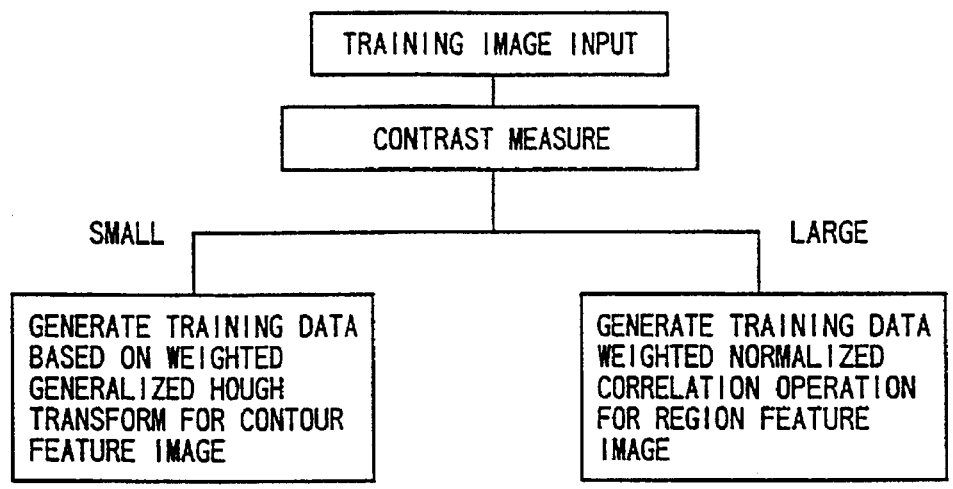
FIGS. 29A and 29B are flowcharts showing procedures for selecting feature images in training images, respectively.

Next, the contrast, $R/\sigma^2$, which is defined as the ratio of the dynamic range R of an intensity image to its variance $\sigma^2$, is measured in advance for a plurality of training images of good object. By selecting the matching method used according to the magnitude of the contrast of the training images of good object, it is possible to provide increased flexibility in processing objects under inspection. That is, the weighted generalized Hough transform based on a contour feature image such as an edge image produces a highly excellent effect on a high-noise, low-contrast image. On the other hand, the weighted normalized correlation based on a region feature image such as an intensity feature image is suitable for application to a relatively low-noise, high-contrast image. As depicted in FIG. 29A, the contrast of each training image is measured and the measured value is subjected to thresholding. When the contrast is smaller than the threshold value, the weighted generalized Hough transform shown in FIG. 7 is performed using the contour feature image to generate training data. When the contrast is larger than the threshold value, the weighted normalized correlation operation shown in FIG. 17 is performed using the region feature image to generate training data. Such automatic selection of the matching method permits more flexible inspection control. In this instance, the threshold value differs for each particular image of the inspected object, and hence is determined experimentally.

Figure 29B:
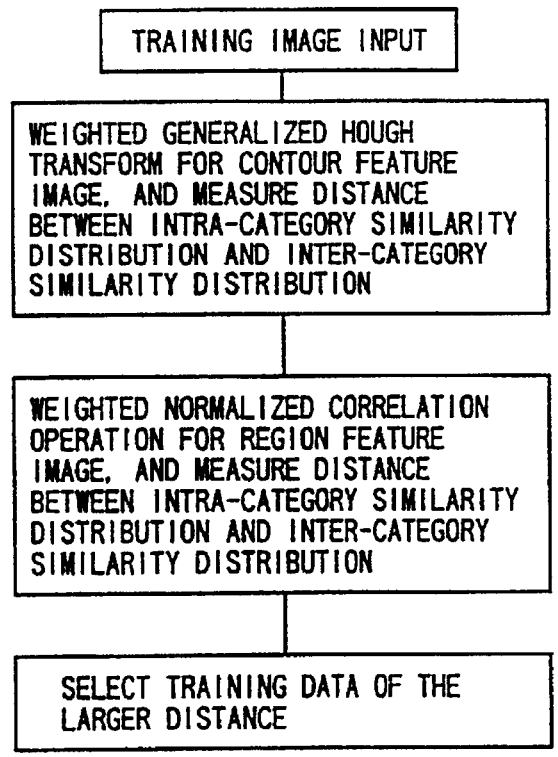

Alternatively, as depicted in FIG. 29B, the weighted generalized Hough transform is performed for the contour feature image of the training image and the distribution distance between the similarity distributions of good and no good objects is measured, where are for the region feature image the weighted normalized correlation operation is formed and the distribution distance between the similarity distributions of good and no good objects is measured. By selecting the training data of the larger distribution distance, the optimum matching method can be adopted.

Third Embodiment

Figure 20:
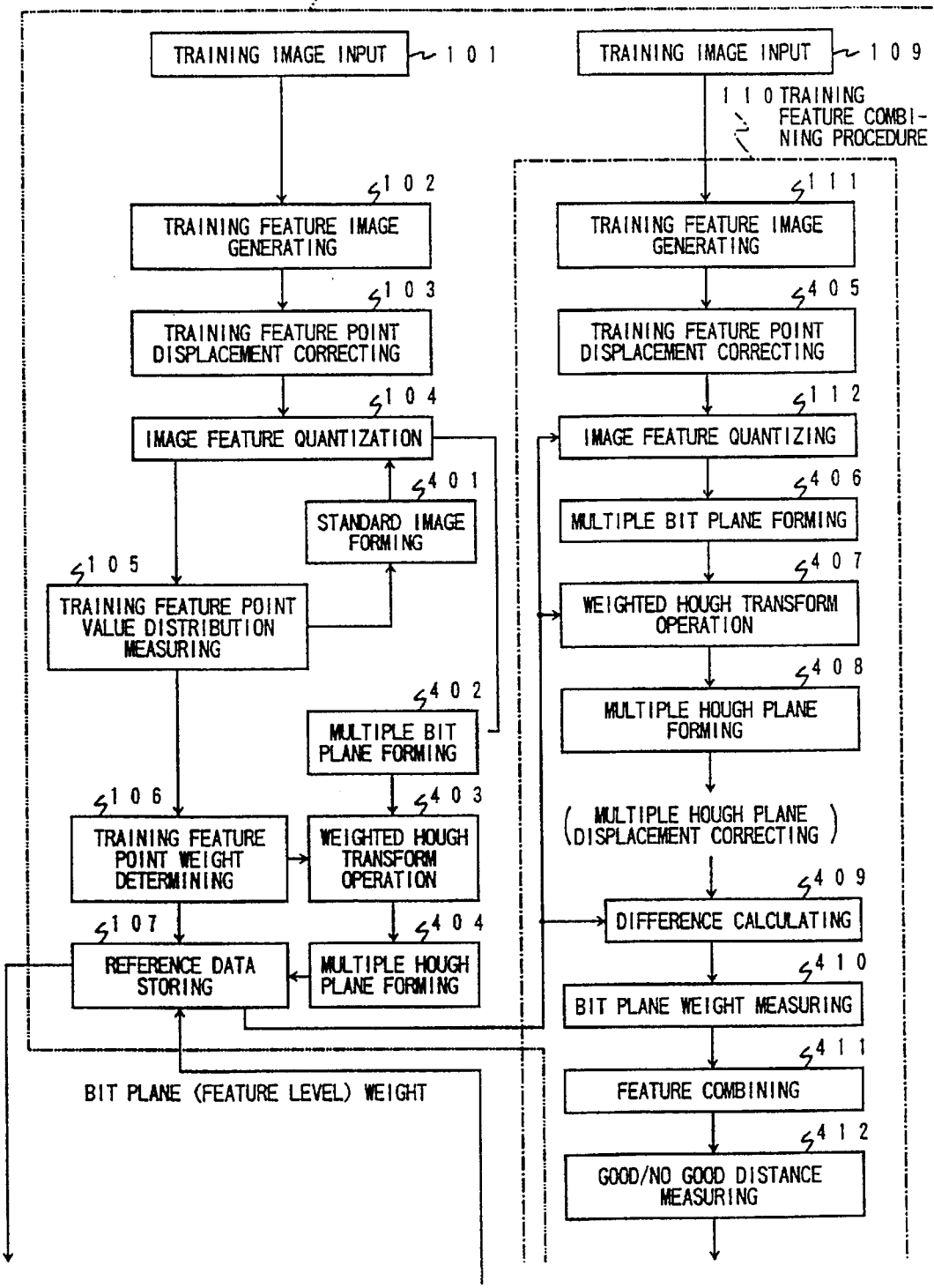
FIG. 20 is a flowchart showing the procedure involved in the generation of reference data in a third embodiment of the present invention.
Figure 21:
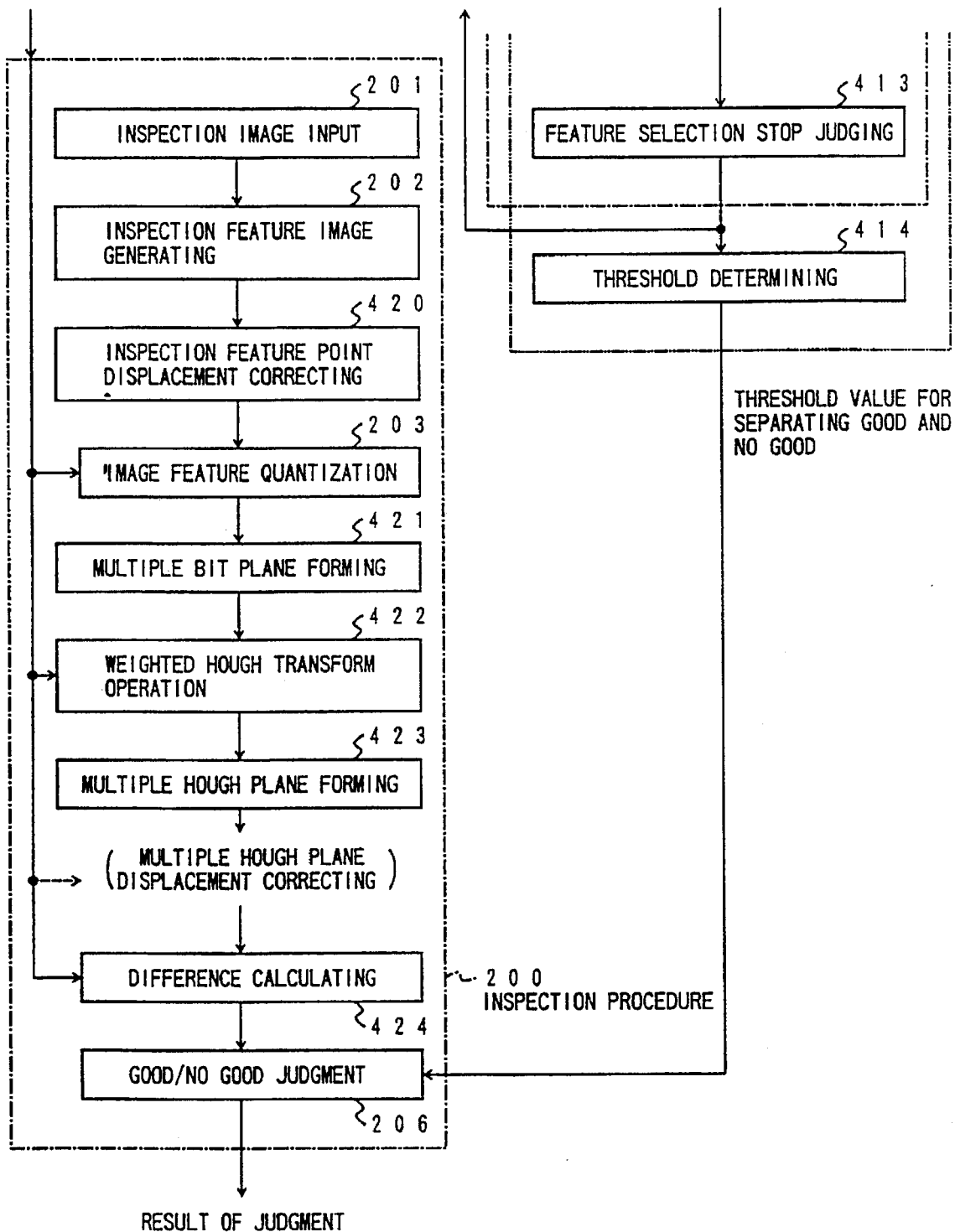
FIG. 21 is a diagram showing the inspection procedure involved in the third embodiment.

Turning next to FIGS. 20 and 21, an inspection based on a weighted difference operation on Hough planes will be described as an example of an inspection employing a weighted difference operation. This embodiment uses the extent as a feature including the phase relationship around an edge point. The extent is a feature value of each pixel that is defined by the mean value, $$\sum_{i=1}^{n} d_i/n,$$

of lengths of radial scanning lines from the pixel within a certain extracting field radius to edges which the scanning lines meet for the first time, respectively. On the edge, the extent is zero and includes properties of the edge as well. Let it be assumed here that the edge point is a zero crossing point which is not readily affected by an intensity variation. This embodiment aims to provide enhanced recognition ability through utilization of feature sets of both of the extent distribution and the intensity distribution. These image features are described in the frame of multiple resolution (multiple resolution planes) so that a coarse-to-fine efficient recognition strategy can be adopted in the Hough transform operation.

This embodiment is directed to inspection processing based on a "feature multiplied Hough transform." In a training feature image forming step 102, a plurality of training feature images of good object are compressed by smoothing and resampling processing, after which features are extracted for each specified resolution level and stored in a multiple resolution, multi-layer feature plane.

Now, let a set of features extracted for each resolution be represented by $$\Omega = (((F_k(x,y), x=1, \ldots, D_x), y=1, \ldots, D_y), k=1, \ldots, N_f)$$

where $N_f$ is the number of features and $D_x \times D_y$ is resolution.

As in the first and second embodiments, the quantization of image features is carried out in step 104 and the weights of respective feature points are determined on the basis of feature value histograms of the training feature points obtained in steps 105 and 106. The weights are normalized so that the sum total of feature points becomes equal to a predetermined feature point number $N_p$. At the same time, in a standard image forming step 401, a feature value or mean value that provides the maximum frequency value is calculated from the feature histogram of each training feature point, and the calculated value is assigned to the feature point, by which a standard feature image is formed.

The standard feature image is subjected to the processing described below.

In step 104, image features in the standard feature image are quantized with a view to increasing the efficiency of the system and the efficiency of matching by the Hough transform operation as described previously in respect to the first embodiment. Letting $G_k(x,y)$ represent the feature value obtained by quantizing the feature value $F_k(x,y)$ at each feature point (x,y) in the respective standard feature image k through the use of the quantization level number $I_q(k)$, $$G_k(x,y) = ((F_k(x,y) - F_{min}))/(R_x)) \times I_q(k)$$

where, $$0 \leq G_k(x,y) \leq I_q(k)-1$$

In the above, $F_{min}$ is the minimum value of the feature value $F_k$ and $R_k$ is the dynamic range of the feature value $F_k$.

In a multiple bit plane forming step 402, the feature value $G_k(x, y)$ is mapped onto a multiple feature bit plane $B_k$ which expresses ON/OFF of an (x,y) plane corresponding to each quantization level (the feature value level). That is, $$B_k = [B_{ku}(x,y), u=0, \ldots, I_q(k)-1]$$

Figure 23:
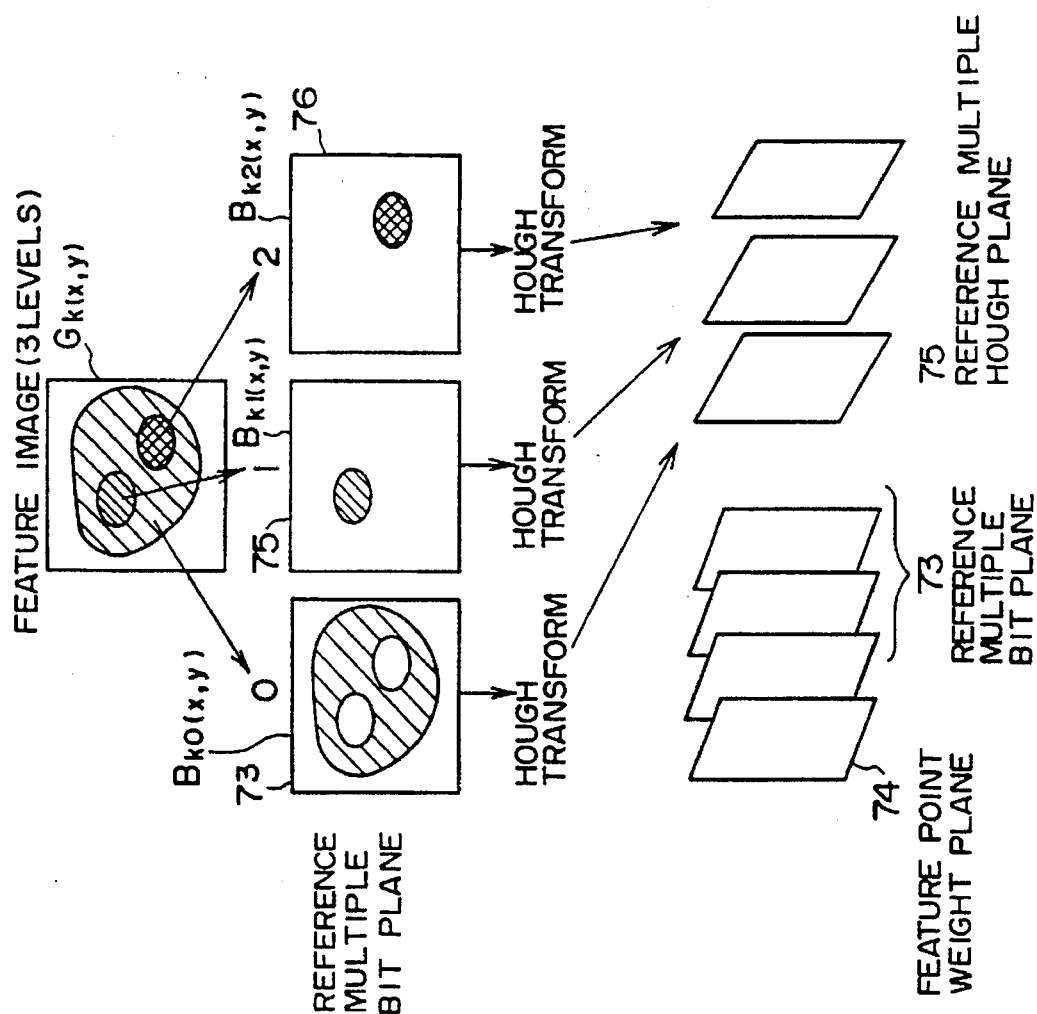
FIG. 23 shows conceptually the relationship between a feature image and its multiple bit planes and reference tables.

Suppose, for example, that the quantized feature value $G_k(x,y)$ is 2 at the feature point (x,y) after quantization with the quantization level number $I_q(k)=4$. On the plane $B_{ku}(x, y)$, the bit is ON only when u=2; that is, $B_{k2}(x,y)=1$. When u≠2, the bit is OFF; that is, $B_{k0}(x,y)=B_{k1}(x,y)=B_{k3}(x,y)=0$. For example, a feature image ($G_k(x,y)$) 73, quantized into three values of a certain cell as shown in FIG. 23, is mapped onto a feature bit plane ($B_{k0}(x,y)$) 74 of a quantized value (a feature value level) 0, a feature bit plane ($B_{k1}(x,y)$) 75 of a quantized value (feature value level) 1, and a feature bit plane ($B_{k2}(x,y)$) 76 of a quantized value (feature value level) 2.

This mapping takes place for each feature, then elements are coupled in cascade, thereby defining a multiple feature bit plane B for all features. That is, $$[[B_{1u}(x, y), u = 0, \ldots, I_q(1) - 1],$$
$$[B_{ku}(x, y), u = 0, \ldots, I_q(k) - 1],$$
$$[B_{N_fu}(x, y), u = 0, \ldots, I_q(N_f) - 1]] \text{---}\!>\!>\!>$$
$$B = [B_v(x, y), v = 0, \ldots, V - 1]$$

where V is the multiplicity of the multiple feature bit plane B, which is given by $$V = \sum_{K=1}^{N_f} I_q(k)$$

Next, in a weighted Hough transform operation step 403, the weighted Hough transform operation is performed. That is, only when the bit at the point (x,y) is ON, $$\theta = (t-1)\Delta\theta,$$

However, for $\Delta\theta=\pi/D_\theta$, t=1, ..., $D_\theta$, the following address translation is performed $$\rho = (x-x_0) \cos \theta + (y-y_0) \sin \theta$$

and the weight w at the point (x,y) is accumulated to a point $(\rho, \theta)$ on a Hough plane H which is a voting plane obtained by quantizing $(\rho, \theta)$ with a dividing number $D_\rho D_\theta$.

$$H = ((h(r,t), r=1, \ldots, D_\rho), t=1, \ldots, D_\theta)$$

Here, $$r = (\rho + \rho_0)/\Delta\rho,$$

where, $$\rho_0 = \sqrt{(D_x^2 + D_y^2)}/2$$

$$\Delta\rho = \sqrt{(D_x^2 + D_y^2)}/D_\rho$$

$(x_0, y_0)$: coordinates of the origin This operation is performed for all (x,y) points (x=1, ..., $D_x$, y=1, ..., $D_y$).

In a multiple Hough plane forming step 404, the above-described operation is performed for each bit plane $B_v$ (v=0, ..., V-1) of the multiple feature bit plane, by which a multiple Hough plane HM is formed.

$$HM = (((h_v(r,t), r=1, ..., D(\rho)), t=1, ..., D(\theta)), v=0, ..., V-1)$$

Each feature point weight information and the multiple Hough plane information calculated by the above operation are stored in a reference table for each image feature in step 107. Furthermore, the location and weight of each feature point on each bit plane are stored in such a reference table as depicted in FIG. 14. In this instance, the feature point weight may be used in common to the respective bit planes for the same feature image, or the feature point weight may be calculated for each bit plane. FIG. 23 shows the case of using a feature point weight plane 74 in common to the multiple bit planes 73. These planes and a reference multiple Hough plane 75 are stored in the reference memory.

The training feature combining procedure 110 starts with step 111 of forming training feature images from training images of good and no good objects, followed by step 405 of correcting the training feature images for feature point displacement. The reason for performing the displacement correction at this stage is to allow ease in establishing a correspondence between the training feature points and addresses of feature points in a standard feature image at the time of performing the weighted Hough transform operation.

In step 112 the displacement-corrected feature images are quantized, followed by step 406 wherein a multiple bit plane is formed, and then by step 407 wherein the weighted Hough transform operation is performed using feature point weights of the standard feature image. As a result, a multiple Hough plane is formed in step 408, and in step 409 the difference is calculated between the multiple Hough plane and that for the standard image stored in the reference table as described below.

In this case, since the relative displacement between the multiple Hough planes has already been corrected, the difference dis(v) between the two Hough planes h and h' in relation to the feature value level (the quantized value) v is defined as follows:

$$dist(v) = \sum_{t=1}^{D_\theta} \sum_{r=1}^{D_\rho} |h(r, t) - h'(r, t)|/(D_\theta D_\rho)$$

When the feature point weights of the standard image are all the same, the displacement correction can be made on the basis of the distributions of the multiple Hough planes. The rotation correction can be achieved by arranging elements of the multiple Hough planes in different orders so that their array elements concerning t, for instance, match in the maximum frequency direction $$t_{MAX} = MAX[t|h_v(r,t), r=1, ..., D_\rho, t=1, ..., D_\theta]$$

The correction of the position of the center of gravity can be made by calculating the amount of displacement that minimizes the difference.

In a bit plane weight measuring step 410, the difference is weighted; this is carried out by weighting the feature value level v, that is, by weighting the bit plane. A statistic weighting factor such as Bhattacharyya distance can be used when the intra-category distribution (the good object distribution, for example) and the inter-category distribution (the distribution of no good object to good object) concerning the difference follow the normal distribution, but since the number of training samples is small in many cases, a different measure is needed. This embodiment uses, as such a measure, the distance between the worst one of the simplest intra-category distributions (the worst among good objects, for example) and the best one of the inter-category distributions (the closest one of no good objects to good objects).

Letting the number of training samples for each category be represented by M, a sequence of difference distribution among good objects to a v-th feature level is defined as follows:

$$dist_W(v) = \{dist_W(1,v), ..., dist_W(m,v), ..., dist_W(M,v)\}$$

Letting the number of samples of no good object be represented by N, a sequence of difference distribution between good and no good objects to the v-th feature level is defined as follows:

$$dist_B(v) = \{dist_B(1v), ..., dist_B(n,v), ..., dist_B(N,v)\}$$

Here, the weight of the v-th feature level is given as follows:

$$W(v) = MIN (dist_B(v)) - MAX (dist_W(v)) + c$$

where c is an offset value for $W(v) \geq 0$.

In general, the inspection ability should be evaluated for all combinations at each feature level, but from the viewpoint of high efficiency training, a sequential feature selection procedure of combining features in descending order of feature level is employed in a feature combining step 411. That is, setting a newly sequenced weight sequence to $$W(v) = SORT[v|W(v)]$$

the difference distribution among good objects $dist_W(m, V_r)$ and the difference distribution between good and no good objects $dist_B(n', V_r)$ which are generated when features are confined down to a Vr-th one in descending order of weight are given as follows:

$$dist_W(m, V(n)) = \sum_{v=1}^{V_r} (W(v) \, dist_W(m, v)) / \sum_{v=1}^{V_r} W(v) \quad (11)$$

$$dist_B(n', V(n)) = \sum_{v=1}^{V_r} (W(v) \, dist_B(n', v)) / \sum_{v=1}^{V_r} W(v) \quad (12)$$

Then, in step 412 the number of times the sequence of difference distribution between good and no good objects overlaps the sequence of difference distribution among good objects, that is, a count number overlap (n, $V_r$) of the difference distribution between good and no good objects $dist_B(n, V_r)$, defined below is calculated as a simple measure which provides the difference between the distribution $dist_W(m, V_r)$ and the distribution $dist_B(n', V_r)$.

$$dist_B(n', V_r) \leq \underset{m}{MAX} \; [dist_w(m, V_r) + \epsilon]$$

In general, this count number asymptotically approaches zero as the number of features combined $V_r$ is increased. (Here, $\epsilon$ ($\geq 0$) is a safety parameter which increases the number of overlaps to cause an increase the number of features combined, providing security of the system.) When the count number does not decrease even if the number of feature levels combined $V_r$ is increased, the combination of feature levels is discontinued in step 413. Let the number of feature levels combined at that time be represented by $L_r^*$ and the value obtained by dividing the limit count number by the sample number N of no good object be represented by $N_u^*$ ($0 \leq N_u^* \leq 1$). That is, $$L_r^* \; (n) = \text{OPTMIN}[V_r, \text{overlap}(V_r)]$$

$$N_u^* \; (n) = \text{overlap}(Lr^*)/N \qquad (13)$$

The value $N_u^*$ is a measure for evaluation; the smaller the value, the more the inspection ability increases. A measure $\Psi$, converted from the above measure so that the larger its value, the more the inspection ability increases, is set as follows:

$$\Psi = 1 - N_u^* \qquad (14)$$

In step 414, a threshold for judging whether the object under inspection is good or no good is set to a value intermediate between the intra-category (good object) difference distribution and the inter-category (between good and no good objects) difference distribution, or the limit value of good object (a value with an allowance of the safety parameter $\epsilon$).

In the inspection procedure, an inspection image is inputted in step 201; an inspection feature image is formed in step 202; the displacement is corrected in step 420; the inspection feature image is quantized in step 203; a multiple bit plane is formed in step 421; weighted Hough transform is performed in step 422; a multiple Hough plane is formed in step 423 and, if necessary, displacement is corrected; the difference between the multiple Hough plane and the reference multiple Hough plane formed in step 404 is calculated by Eq. (11) through the use of the optimum combination of feature point weights and the optimum combination of feature levels obtained in the training procedure, in step 424; and a threshold value is used to judge if the object under inspection is good or no good in step 206.

Fourth Embodiment

Figure 22:
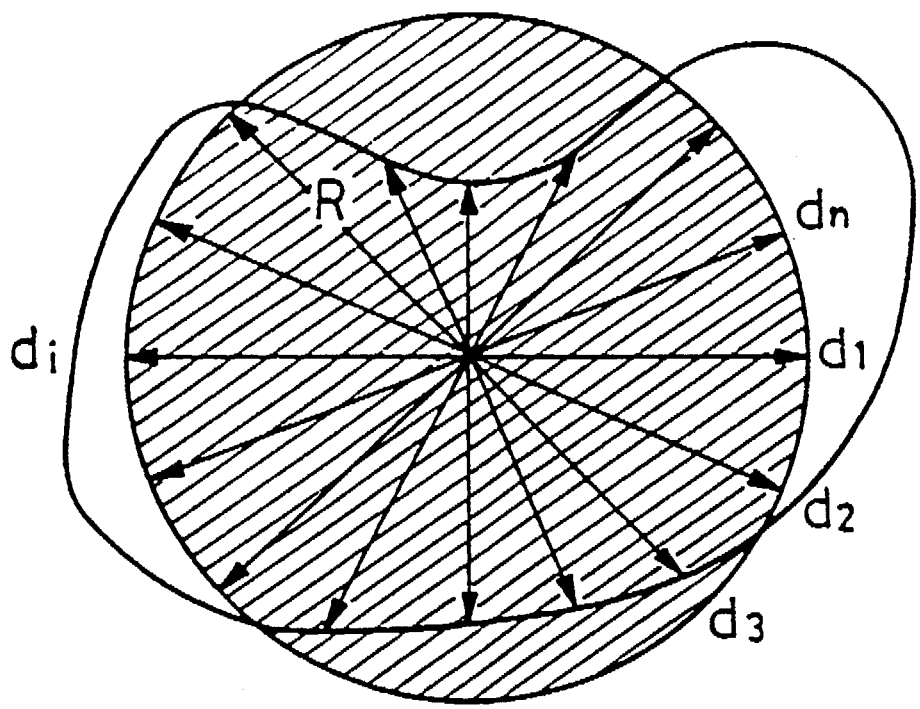
FIG. 22 is a diagram showing an example of an extent feature.
Figure 24:
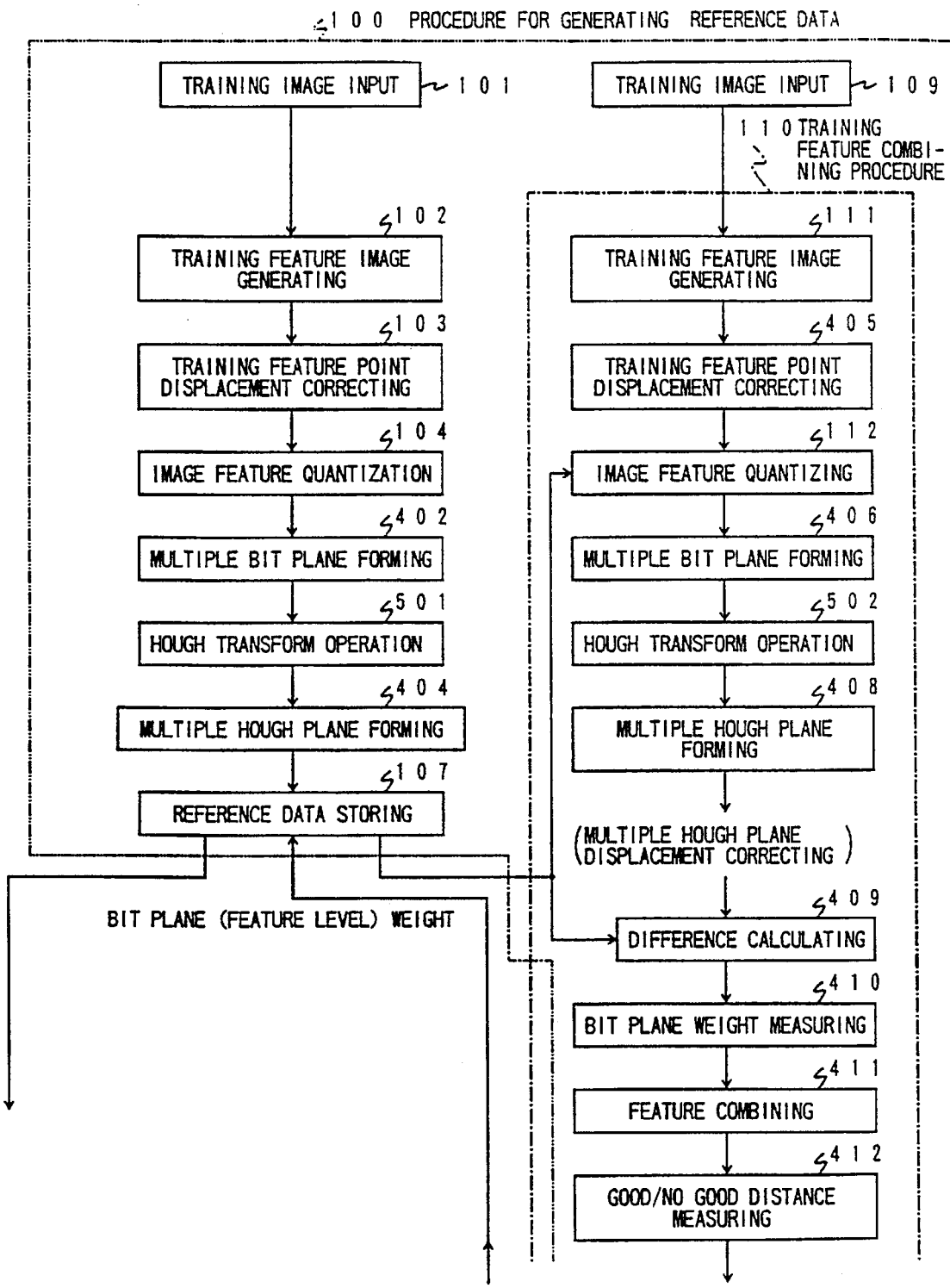
FIG. 24 is a flowchart showing the procedure involved in the generation of reference data in a fourth embodiment of the present invention.
Figure 25:
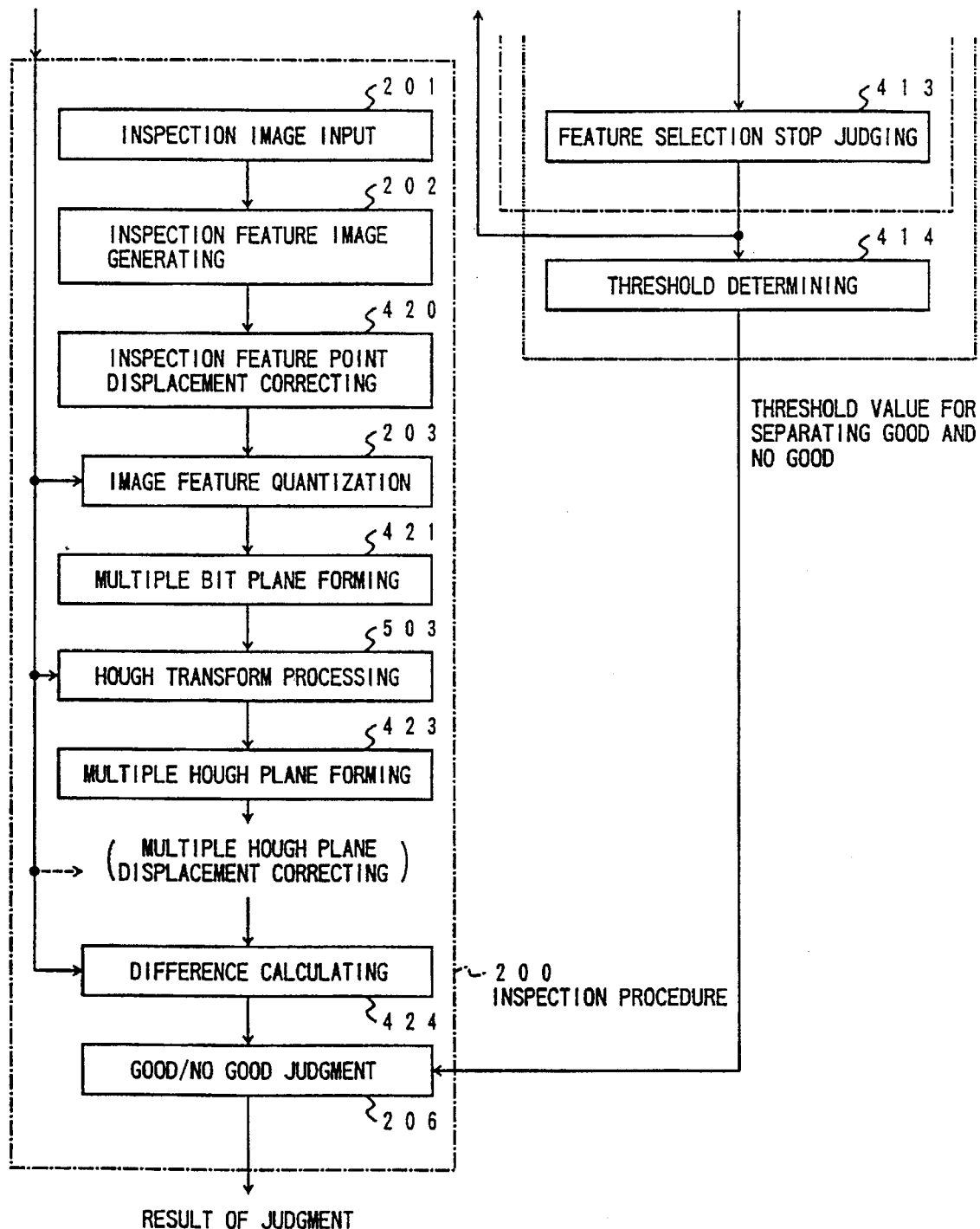
FIG. 25 is a flowchart showing the inspection procedure involved in the fourth embodiment.

Although in the third embodiment the weighted Hough transform was based on the feature point weight, it is also possible, with a mere Hough transform, to discriminate between good and no good objects with high reliability, recognize objects with a high recognition rate and sort objects with certainty in environments where the image intensity varies under the influence of noise or a change in the condition of illumination. The flow of processing in this case is shown in FIGS. 24 and 25, in which the steps corresponding to those in FIGS. 20 and 21 are identified by the same reference numerals. Since the processing in this embodiment is mostly the same as in the third embodiment, a description will be given principally of the difference between the embodiments. This embodiment also utilizes feature sets of both of the extent distribution depicted in FIG. 22 and the intensity distribution, as the feature including the phase relationship around the edge point. In this embodiment, the quantized training feature image is processed to form the multiple bit plane B in the multiple bit plane forming step 402. In a Hough transform operation step 501 the Hough transform is performed for each bit plane of the multiple bit plane B. In the weighted Hough transform operation step 403 shown in FIG. 20 the feature point weight W of the point (x,y) where the bit is turned ON is accumulated (voted) to the corresponding point ($\rho$, $\theta$), but in step 501 "1" is accumulated. In step 404 such a multiple Hough plane is generated and in step 107 it is stored in the reference table.

In the displacement correcting step 405 of the training feature combining procedure 110, the center of gravity of the feature image inputted in step 109 is set to the coordinate origin ($x_0$, $y_0$), and possible measures for the pose are i) the main-axis direction by a moment operation, ii) calculation of the mean direction and iii) the maximum-frequency direction, but from the viewpoints of robustness and affinity for the Hough transform, the maximum-frequency direction is used to correct the rotation of the pose—this is the same correction as made in step 405 in FIG. 20. In step 502, a mere Hough transform operation, not the weighted one, is conducted for the multiple bit plane obtained in step 406. This Hough transform operation is carried out in the same manner as in step 501. In this way, the difference between the multiple Hough plane of the training image inputted in step 109 and the reference Hough plane stored in the reference table in step 107 is calculated in step 409; in step 410, the weights of the bit planes are determined; in step 411, feature levels are combined; in step 412, the number at which the sequence of difference distribution between good and no good objects becomes smaller than the worst value of the difference distribution among good objects, that is, the number of overlappings, is counted; in step 413, the number of feature levels combined is increased until the count number no longer decreases and the count value at that time is used to obtain measures for the evaluation of inspection and recognition abilities; and in step 414, the threshold for judgement is determined by the processing as in the third embodiment.

In the inspection procedure 200, this embodiment is the same as the third embodiment in the processing from step 201 through 412. In this embodiment, however, each bit plane of the multiple bit plane is subjected to the Hough transform processing in step 503, that is, the Hough transform processing in step 422 in FIG. 21, in which the feature point weight is "1," is performed. In step 423, the multiple Hough plane is produced for a predetermined feature level. In step 424, the difference between this multiple Hough plane and the reference multiple Hough plane obtained in step 102 is calculated, and in step 206, it is judged whether the object is good or no good in the same manner as in the third embodiment.

Figure 28:
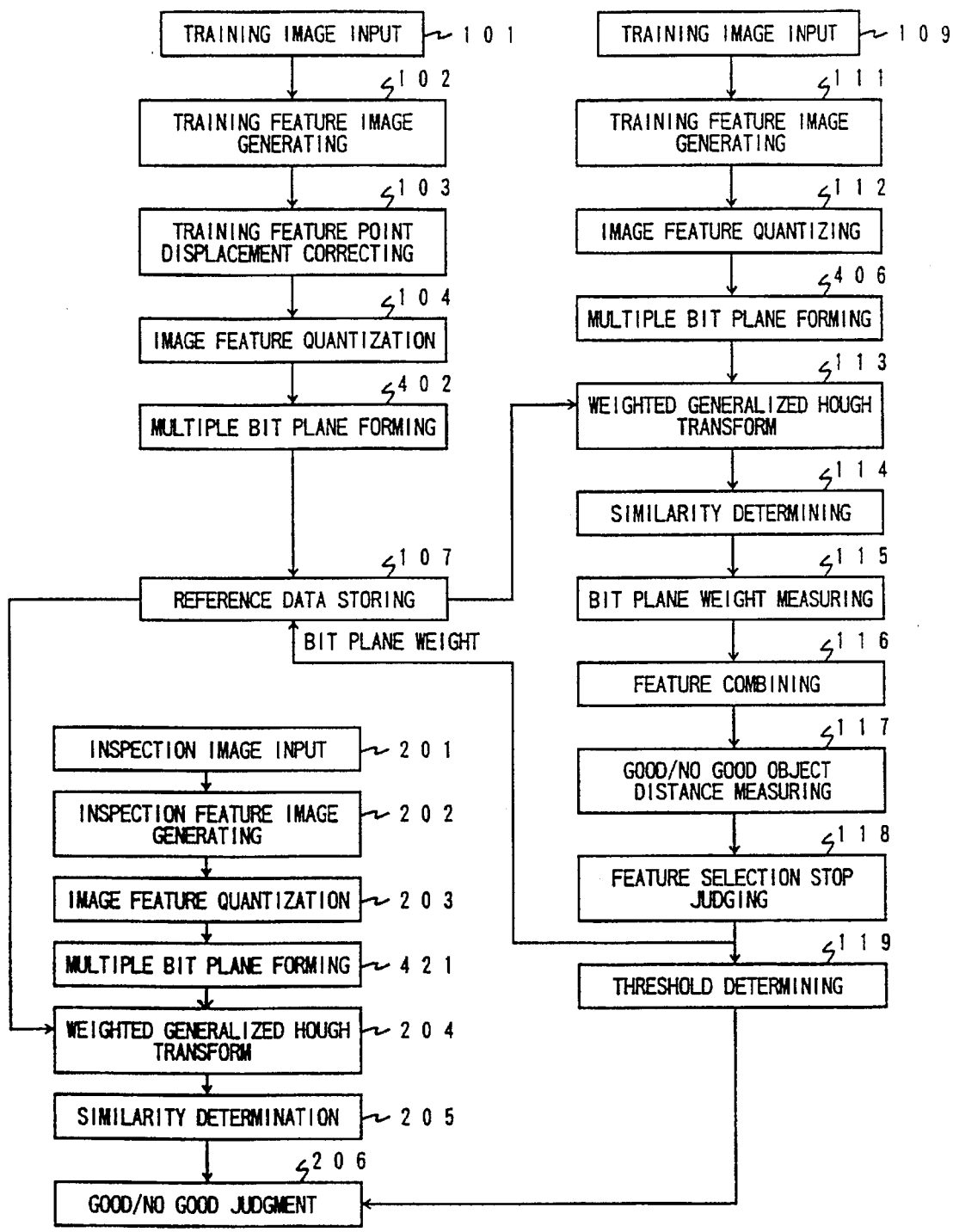
FIG. 28 is a flowchart showing the procedure involved in a fifth embodiment of the present invention.

With the use of such a multiple Hough plane, it is also possible to make an image inspection/recognition by using the similarity in place of the difference. In this instance, as shown in FIG. 28 in which the steps corresponding to those in FIGS. 7, 20 and 21 are identified by the same reference numerals, the quantized feature image obtained in step 104 is rendered into a multiple bit plane in step 402, and in step 107, a reference table having stored therein addresses of feature points, using feature levels as indexes, is produced for each bit plane and stored in a memory. In the training feature image combination processing, the feature image quantized in step 112 is rendered into a multiple bit plane in step 406, and in step 113, each bit plane is subjected to generalized Hough transform processing through the use of the corresponding reference table. That is, the vote in the processing of step 113 in FIG. 7 is always set to "1," not the feature point weight W. In step 114, similarity is calculated for each feature level, that is, for each bit plane, in the same manner as in step 114 in FIG. 7. In step 115, the weight of each bit plane (each feature level) is determined by the same processing as in step 115 in FIG. 7. In step 117, the distance between good and no good objects is calculated for combined bit planes (feature levels) by the same processing as in step 117 in FIG. 7. In step 118, the combination of feature levels is determined as is the case with FIG. 7, and in step 119, the threshold value is similarly determined. In the inspection procedure 200, the quantized feature image obtained in step 203 is processed to form a multiple bit plane in step 421; in step 204, each bit plane is subjected to generalized Hough transform processing, using the reference table with training data stored therein in step 107; and in step 205, similarity is calculated in the same manner as in step 205 in FIG. 7; and in step 206, the similarity and a threshold value are compared to judge whether the object under inspection is good or no good.

In the above the measure of judgement is similarity, but in the case of inspecting an installation position, the amounts of displacement, rotation change and scale change relative to standard values are important. The weighted generalized Hough transform operation and the weighted normalized correlation operation permits the calculation of the displacement and amount of rotation of the origin of the object that provide the maximum frequency, and also permits the detection of the amount of scale change; hence, these operations can be applied to the inspection of installation position. In the case of applying the above-described embodiments to sorting or recognizing, for example, an input image as falling into a particular one of first to n-th categories, an i-th category (where i=1, 2, . . . , n) is set as a good object category and the other categories as no good object categories, training data on the i-th category, that is, the reference table (the reference Hough plane) in the embodiments, is used to obtain the distribution of similarity or difference in the i-th category and the distribution of similarity or difference between the i-th category and each of the others, the optimum combination of features (combination of feature levels) is determined on the basis of the distance between the two distributions, and the input image is sorted or recognized as falling into the category corresponding to the maximum one of n similarities or the minimum one of n differences obtained for the first through n-th categories.

Also in the case of calculating the weighted normalized correlation shown in FIG. 17, it is possible to employ the processing depicted in FIG. 20. That is, a multiple bit plane is formed; the weighted normalized correlation between its corresponding bit planes is calculated; the weights of feature levels (in the bit planes) are calculated; the combination of feature levels is determined; and the weighted normalized correlation between the multiple bit plane of the feature image of the input image and the multiple bit plane of the feature image of the training image is calculated for the above combination. As is the case with the relationship between FIGS. 24 and 28, it is also possible to calculate similarity on the multiple bit plane in FIG. 20, that is, to apply the scheme of FIG. 7 to the multiple bit plane.

In the case of recognizing objects of N categories according to the third embodiment, the measure of evaluation MEAN($N_u^*$) for equally discriminating the N categories is derived from Eq. (12) as follows:

$$\text{MEAN}(N_u^*) = \sum_{n=1}^{N} N_u^*(n)/N$$

The following equation can be used to change this evaluation measure to a measure $\Psi$ which increases the discrimination ability with an increase in its value.

$$\Psi = 1 - \text{MEAN}(N_u^*)$$

Let the mean number of feature level combinations in all of the N categories be represented by MEAN($L_r^*$). That is, $$\text{MEAN}(L_r^*) = \sum_{n=1}^{N} L_r^*$$

This measure $\Psi$ is used to evaluate the selection of the feature level (bit plane) combination.

The difference between an unknown input image and each category can be expressed by the following equation on the basis of Eq. (11), using the optimum feature level combination determined by training.

$$\text{dist}(n, L_r^*(n)) = \Sigma(W(n,v) \text{dist}(v))/\Sigma W(n,v)$$

where $\Sigma$ indicates the summation from v=1 to $L_r^*(n)$. The category n which minimizes this difference is the result of recognition of the unknown input image. In the case of comparing this difference among categories, however, the difference needs to be pre-normalized. A value Dm(n) intermediate between the intra-category difference distribution (Eq. (10)) of each category and the inter-category difference distribution (Eq. (11)), which are determined at the time of selecting the feature level combination, is used to define an allowance $V_a$ given by the following equation.

$$V_a = (Dm(n) - \text{dist}(n, L_r^*(n)))/DM(n)$$

$$Dm(n) = \left\{ \max_m [\text{dist}_W(n, m, L_r^*(n))] + \min_n [\text{dist}_B(n, n', L_r^*(n))] + \epsilon \right\}/2$$

In this instance, the intermediate value Dm(n) is determined taking the safety parameter $\epsilon$ into account. The category with the allowance Va greater than zero and greatest among the categories concerned is judged to be the result of recognition.

Next, a description will be given, with reference to FIG. 26, of an example of an apparatus which embodies this invention method described above. Connected to a common bus 81 are a frame memory 82, an image feature extracting unit 83, a feature image memory 84, an image feature quantizing unit 85, a weighted similarity (difference) calculating unit 86, a reference table memory 87, a good/no good judging unit 88, and a control unit 89 such as a personal computer. Furthermore, the memories 82, 84 and 87 and the units 83, 85, 86 and 88 are interconnected via a dedicated bus 90.

An image of an object under inspection (not shown) is picked up by a video camera unit 91 and the input image (inspection image) therefrom is stored in the frame memory 82 after being converted by an A/D converter into digital form. In the feature extracting unit 83, an image of a predetermined feature, that is, an image of each feature of one of reference tables prestored in the reference table memory 87, is extracted from the input image by the processing of step 202 described previously in respect of FIGS. 7, 17 and 20. The thus extracted feature image is stored in the feature image memory 84. In the image feature quantizing unit 85, the feature image is quantized by the aforementioned step 203 in FIGS. 7, 17 and 20, and the quantized feature image is stored in the feature image memory 84. The stored contents of the reference table memory 87 are: in the case of the FIG. 7 method, that one of the reference tables shown in FIG. 16 which corresponds to the feature selected in step 118; in the case of the FIG. 17 method, that one of the reference tables shown in FIG. 19 which corresponds to the feature similarly selected in step 118; in the case of the FIG. 20 method, that one of the reference tables which corresponds to the feature point weight selected and the corresponding reference multiple Hough plane; in the case of the FIG. 24 method, a reference multiple Hough plane; and in the case of the FIG. 28 method, a feature point and its weight. Furthermore, the threshold values, determined in steps 19 of FIGS. 7, 17 and 24, and steps 414 of FIGS. 20 and 24, are stored corresponding to the above-mentioned data, respectively. In the weighted similarity (difference) calculating unit 86, the quantized image in the memory 84 and the corresponding reference table in the reference table memory 87 are used to perform: in the case of the FIG. 7 method, the weighted generalized Hough transform operation in step 204; in the case of the FIG. 17 method, the weighted normalized correlation calculation in step 310; in the case of the FIG. 28 method, the generalized Hough transform operation and the corresponding similarity calculation; in the case of the FIG. 20 method, the formation of the multiple bit plane, its weighted Hough transform operation and the difference calculation in steps 421, 422 and 424; and in the case of the FIG. 24 method, the formation of the multiple bit plane, the Hough transform operation and the difference calculation in steps 421, 503 and 424. The result of the operation by the weighted similarity (difference) calculating unit 86 is compared, in the judgement unit 88, with the corresponding threshold value stored in the reference table memory 87. The result of the judgement is provided via the control unit 89 to the outside for display on a display not shown. Incidentally, the judgement unit 88 may also be formed through utilization of the functions in the control unit 89.

For example, in the case of making a good/no good inspection of various parts, a large amount of reference data is needed which is prestored in a large-capacity memory such as an external magnetic disk, together with corresponding threshold values, and when the number of the part under inspection is inputted into it, the control unit 89 reads out from the large-capacity memory the corresponding set of reference tables and the threshold value and loads them into the reference table memory 87, starting the inspection. In this case, the control unit 89 holds the threshold value and makes a final good/no good judgement.

Figure 26:
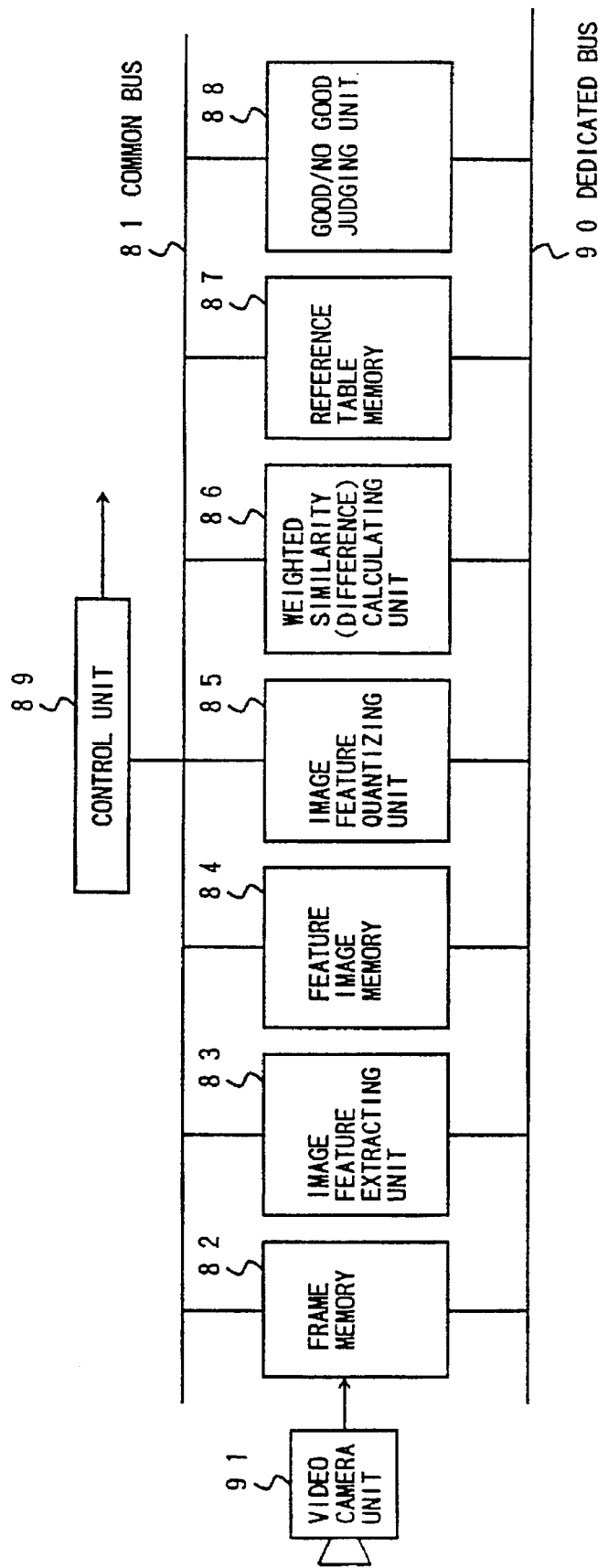
FIG. 26 is a block diagram illustrating an embodiment of the image inspection/recognition apparatus according to the present invention.
Figure 27:
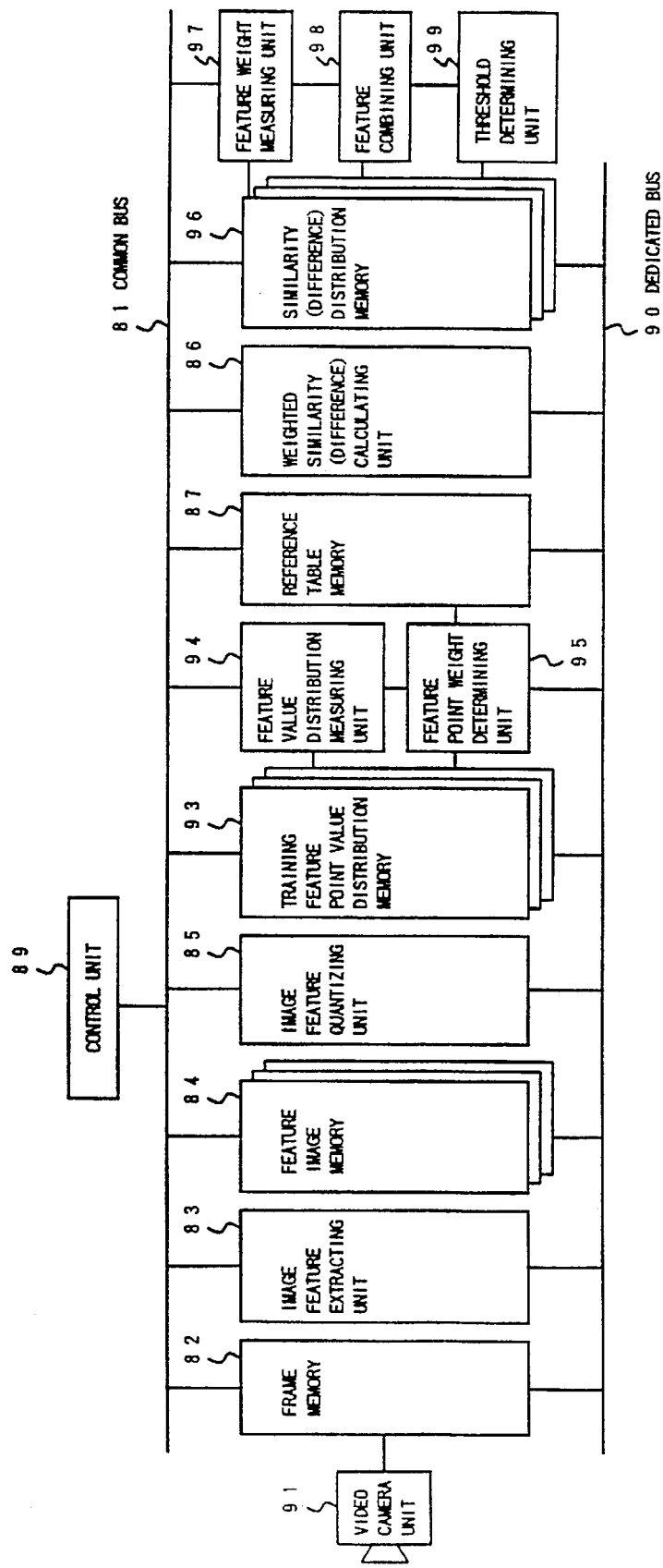
FIG. 27 is a block diagram illustrating an embodiment of the reference data generating apparatus according to the present invention.

FIG. 27 is an example of the device configuration of a reference data generating part. This device has most of the functions of the image inspection apparatus shown in FIG. 26 and is often used also as the image inspection apparatus; therefore, the parts corresponding to those in FIG. 26 are identified by the same reference numerals. This device further comprises a training feature point value distribution memory 93, a feature value distribution measuring unit 94, a feature point weight determining unit 95, a similarity (difference) distribution memory 96, a feature weight measuring unit 97, a feature combining unit 98, and a threshold determining unit 99. The feature image memory 84, the feature point value distribution memory 93 and the similarity (difference) distribution memory 96 each have a multiplate configuration for storing a larger amount of data than in the inspection apparatus shown in FIG. 26.

In this case, as described previously, training images are inputted into the frame memory 82, then various feature images are extracted by the extracting unit 83 from each of the training images and stored in the feature image memory 84, and these feature images are quantized by the quantizing unit 85, thereafter being stored again in the memory 84. For images of the same feature, the feature point value distribution of step 105 is calculated in the feature value distribution measuring unit 94 and is then stored in the memory 93. The feature point weight determining unit 95 uses the feature point value distribution to determine the feature point weight in step 106, and for each feature value, the reference table composed of each feature point and its weight is stored in the memory 87. In the method of FIG. 20, the formation of the standard image in step 401, the formation of the multiple bit plane in step 402 and the weighted Hough transform operation in step 403 are performed to generate the multiple Hough plane, which is also stored in the reference table memory 87.

Next, pluralities of good object training images and no good object training images are inputted, and their feature images are generated and quantized and stored in the feature image memory 84. For these quantized feature images, the weighted similarity (difference) calculation unit 86 performs the weighted generalized Hough transform operation in step 113, the weighted normalized correlation operation in step 309, or the formation of the multiple bit plane, the weighted Hough transform operation and the formation of the multiple Hough plane in steps 406 through 408, then calculates the similarities (differences) from the results of these operations and their distributions in the memory 96. The feature weight measuring unit 97 performs the feature weight (bit plane weight) calculation in step 115 (in step 410) and stores the calculated feature weight in the memory 96. Moreover, the feature combining unit 98 combines features (bit planes) in step 116 (in step 411), then calculates the distance between 10 the good and no good object distributions in step 117 (in step 412) and continues the combining of features (bit planes) until the distance satisfies the aforementioned condition. After this, the threshold value is determined by the unit 99.

In either of the apparatuses of FIGS. 26 and 27, each unit can be formed by a digital signal processor.

According to the first embodiment, as shown in FIG. 9, zero crossing points are extracted from a contour image such as an edge image, the spatial frequency of the edge is varied and the optimum zero crossing point is subjected to the generalized Hough transform operation. By this, it is possible to implement a feature extracting function which is substantially insusceptible to an offset variation in intensity and a relative drop in sensitivity and a matching function which retains the similarity unchanged by virtue of majority logic even if noise is present. Furthermore, the training of each feature point weight for a plurality of training images ensures a stable extraction of feature point against noise, and a multiple cell extracting function, which uses complementary region and contour features in combination and takes into account a resolution change as well, is applied to the weighted generalized Hough transform to permit automatic determination of weights of features in accordance with the property of the image through training. By combining such features, it is possible to realize a highly reliable image inspection with a low good/no good discrimination error rate in environments where intensity variations of sample images of good objects are caused by changes in the condition of illumination, and in the reflection characteristic of the sample surfaces and dust on the samples. It is also possible to implement image recognition with a high recognition rate and image sorting with a low error rate.

According to the second embodiment, the training of each feature point weight for a plurality of training images ensures stable extraction of feature points against noise, and a multiple cell extracting function, which uses complementary region and contour features in combination and takes into account a resolution change as well, is applied to the weighted normalized correlation operation to permit automatic determination of weights of features in accordance with the property of the image through training. By combining such features, it is possible to realize a highly reliable image inspection system with a low good/no good discrimination error rate, an image recognition system with a high recognition rate and an image sorting system with a low error rate in environments where intensity variations of sample images of good objects are caused by changes in the condition of illumination and in the reflection characteristic of the sample surfaces and dust on the samples.

According to the third and fourth embodiments, a selective feature extracting system for a number of sets of complementary features such as extent and the like is applied to the Hough transform and recognition is made on the basis of the similarity or difference for the resulting multiple Hough plane. By this, it is possible to construct an efficient image recognition or sorting system or highly reliable inspection system which maintains its high discrimination ability even in environments where the image intensity varies with a change in the condition of illumination or noise is present.

It will be apparent that many modifications and variations may be effected without departing from the scope of the novel concepts of the present invention.

What is claimed is:

1. An image inspection/recognition method comprising the steps of:
   (1) obtaining feature images of predetermined plural features each of a plurality of training images;
   (2) quantizing feature values at respective feature points of the feature images with a predetermined quantization step;
   (3) obtaining a histogram of feature values of the quantized feature images of each of said plural features at each of the respective feature points;
   (4) determining weights for respective feature points of each of said plural features based on the feature value histograms to define reference data of each of said plural features having the weights at the respective feature points;
   (5) extracting an image feature of at least one of said plural features from an input image to form a feature image of the input image;
   (6) quantizing feature values at respective feature points of said feature image of the input image with the predetermined quantization step to obtain a quantized feature image of the input image; and
   (7) calculating the similarity or difference at respective feature points between said quantized feature image of the input image and the reference data of each of said plural features and combining the similarity or different for said plural features with one another with predetermined feature weights to produce weighted similarity or difference;
   said step (7) comprising obtaining weighted difference by subjecting said quantized feature image of the input image to a weighted Hough transform operation by voting the weights of said feature points in said reference data to a parameter space of positions for each quantized level to obtain a Hough plane and calculating the difference between said Hough plane and a reference Hough plane obtained from said quantized feature images of said training images.

2. An image inspection/recognition method comprising the steps of:
   (1) obtaining feature images of predetermined plural features each of a plurality of training images;
   (2) quantizing feature values at respective feature points of the feature images with a predetermined quantization step;
   (3) obtaining a histogram of feature values of the quantized feature images of each of said plural features at each of the respective feature points;
   (4) determining weights for respective feature points of each of said plural features based on the feature value histograms to define reference data of each of said plural features having the weights at the respective feature points;
   (5) extracting an image feature of at least one of said plural features from an input image to form a feature image of the input image;
   (6) quantizing feature values at respective feature points of said feature image of the input image with the predetermined quantization step to obtain a quantized feature image of the input image; and
   (7) calculating the similarity or difference at respective feature points between said quantized feature image of the input image and the reference data of each of said plural features and combining the similarity or different for said plural features with one another with predetermined feature weights to produce weighted similarity or difference;
   wherein in said step (4) the sum total of the weights of said feature points in each of said plural features is normalized with the number of feature points.

3. An image inspection/recognition method comprising the steps of:
   (1) extracting an image feature from an input image and forming a feature image;
   (2) quantizing said feature image with a predetermined quantization step to obtain a quantized feature image; and
   (3) calculating the similarity between each feature point in said quantized feature image and reference data of the corresponding features obtained with training images of the same category;
   said step (3) comprising:
   (4) generating from said quantized feature image a multiple bit plane composed of bit planes corresponding to respective quantized levels of said quantized feature images;
   (5) subjecting predetermined ones of said bit planes to a generalized Hough transform operation through the use of said reference data; and (6) calculating said similarity from said Hough transformed bit planes.

4. An image inspection/recognition method comprising the steps of:
(1) obtaining feature images of predetermined plural features each of a plurality of training images;
(2) quantizing feature values at respective feature points of the feature images with a predetermined quantization step;
(3) obtaining a histogram of feature values of the quantized feature images of each of said plural features at each of the respective feature points;
(4) determining weights for respective feature points of each of said plural features based on the feature value histograms to define reference data of each of said plural features having the weights at the respective feature points;
(5) extracting an image feature of at least one of said plural features from an input image to form a feature image of the input image;
(6) quantizing feature values at respective feature points of said feature image of the input image with the predetermined quantization step to obtain a quantized feature image of the input image; and
(7) calculating the similarity or difference at respective feature points between said quantized feature image of the input image and the reference data of each of said plural features and combining the similarity or different for said plural features with one another with predetermined feature weights to produce weighted similarity or difference;
wherein said step (1) further includes a step of deciding whether the contrast of said plurality of training images of the same category is higher than a predetermined value or not; and wherein when the contrast is higher than said predetermined value, a region feature image is extracted as said feature image in said step (1) and a weighted normalized correlation operation is performed in said step (7) to obtain said weighted similarity, and wherein when said contrast is lower than said predetermined value, a contour feature image is extracted as said feature image in said step (1) and a weighted generalized Hough transform operation is performed in said step (7) to obtain said weighted similarity.

5. An image inspection/recognition method comprising the steps of:
(1) obtaining feature images of predetermined plural features each of a plurality of training images;
(2) quantizing feature values at respective feature points of the feature images with a predetermined quantization step;
(3) obtaining a histogram of feature values of the quantized feature images of each of said plural features at each of the respective feature points;
(4) determining weights for respective feature points of each of said plural features based on the feature value histograms to define reference data of each of said plural features having the weights at the respective feature points;
(5) extracting an image feature of at least one of said plural features from an input image to form a feature image of the input image;
(6) quantizing feature values at respective feature points of said feature image of the input image with the predetermined quantization step to obtain a quantized feature image of the input image; and
(7) calculating the similarity or difference at respective feature points between said quantized feature image of the input image and the reference data of each of said plural features and combining the similarity or different for said plural features with one another with predetermined feature weights to produce weighted similarity or difference;
wherein said method further includes the steps of:
performing a weighted generalized Hough transform operation on contour feature images of pluralities of different categories and measuring distance between intra-category similarity distribution and inter-category similarity distribution;
performing a weighted normalized correlation operation on region feature images of said pluralities of different categories and measuring distance between intra-category similarity distribution and inter-category similarity distribution;
selecting the one of said weighted generalized Hough transform operation and said weighted normalized correlation operation which provided a larger distance than the other; and
said step (7) performs the selected operation to obtain said similarity or difference of feature points.

6. An image inspection/recognition method comprising the steps of:
(1) obtaining feature images of predetermined plural features each of a plurality of training images;
(2) quantizing feature values at respective feature points of the feature images with a predetermined quantization step;
(3) obtaining a histogram of feature values of the quantized feature images of each of said plural features at each of the respective feature points;
(4) determining weights for respective feature points of each of said plural features based on the feature value histograms to define reference data of each of said plural features having the weights at the respective feature points;
(5) extracting an image feature of at least one of said plural features from an input image to form a feature image of the input image;
(6) quantizing feature values at respective feature points of said feature image of the input image with the predetermined quantization step to obtain a quantized feature image of the input image; and
(7) calculating the similarity or difference at respective feature points between said quantized feature image of the input image and the reference data of each of said plural features and combining the similarity or different for said plural features with one another with predetermined feature weights to produce weighted similarity or difference;
said steps (2) through (4) being repeated for each of different quantization steps for object training images to obtain distribution of maximum frequencies as similarity in the histograms of each of feature images of first and second categories of the training images,
said method further including a step of determining one of the quantization steps which maximized the distance between the distribution of similarities in feature images of said first and second categories; and
said step (7) quantizes said plurality of training images through the use of a quantization width which maximizes the distance between the distribution of similarity or difference of the first and second categories of feature images.

7. An image inspection/recognition method comprising the steps of:
   (1) obtaining feature images of predetermined plural features each of a plurality of training images;
   (2) quantizing feature values at respective feature points of the feature images with a predetermined quantization step;
   (3) obtaining a histogram of feature values of the quantized feature images of each of said plural features at each of the respective feature points;
   (4) determining weights for respective feature points of each of said plural features based on the feature value histograms to define reference data of each of said plural features having the weights at the respective feature points;
   (5) extracting an image feature of at least one of said plural features from an input image to form a feature image of the input image;
   (6) quantizing feature values at respective feature points of said feature image of the input image with the predetermined quantization step to obtain a quantized feature image of the input image; and
   (7) calculating the similarity or difference at respective feature points between said quantized feature image of the input image and the reference data of each of said plural features and combining the similarity or different for said plural features with one another with predetermined feature weights to produce weighted similarity or difference;
   said steps (2) and (3) being repeated for each of a plurality of different quantization steps to obtain mean integrated squared errors of feature value histograms of feature points in said feature images of said plurality of training images of a predetermined category, and said step (6) quantizing said feature image through the use of a quantization width which minimizes the mean integrated squared errors.

8. The method of claim 6, wherein said training images are images obtained from good objects and no-good objects and said distribution distance is the distance between good and no-good object distributions, said step (7) further comprising a step of comparing said weighted similarity or said weighted difference and a threshold value to judge whether an object corresponding to said input image is good or no good.

9. The method of claim 7, wherein said step (7) is repeated for each of different amounts of displacement, rotation or scale change of the origin of an object under inspection, as a measure of inspection, and said method further includes a step of determining the amount which maximizes said weighted similarity or minimizes said weighted difference.

10. The method of claim 7, wherein said training images are images obtained from good objects of a same category and said mean integrated squared error is for said good objects, said step (7) further comprising a step of comparing said similarity or difference with a threshold value to judge whether an object corresponding to said input image is good or no good.

11. The method of claim 7 or 10, wherein said step (7) is repeated for each of different amounts of displacement, rotation or scale change of the origin of an object under inspection, as a measure of inspection, and said method further includes a step of determining the amount which maximizes said weighted similarity or minimizes said weighted difference.

12. An image inspection/recognition method comprising the steps of:
   (1) obtaining feature images of predetermined plural features each of a plurality of training images;
   (2) quantizing feature values at respective feature points of the feature images with a predetermined quantization step;
   (3) obtaining a histogram of feature values of the quantized feature images of each of said plural features at each of the respective feature points;
   (4) determining weights for respective feature points of each of said plural features based on the feature value histograms to define reference data of each of said plural features having the weights at the respective feature points;
   (5) extracting an image feature of at least one of said plural features from an input image to form a feature image of the input image;
   (6) quantizing feature values at respective feature points of said feature image of the input image with the predetermined quantization step to obtain a quantized feature image of the input image; and
   (7) calculating the similarity or difference at respective feature points between said quantized feature image of the input image and the reference data of each of said plural features and combining the similarity or different for said plural features with one another with predetermined feature weights to produce weighted similarity or difference;
   said step (7) determining said plurality of different feature images by the steps of:
   (8) obtaining pluralities of quantized feature images from a plurality of training images of a plurality of categories;
   (9) obtaining the weighted similarity or difference of training images through the use of said reference data obtained in said step (4);
   (10) obtaining the similarity or difference of each of said feature images based on the similarity or difference of feature points in each feature image obtained in said step (9);
   (11) determining weight of each feature from said similarities or differences of the feature images of the same feature in different categories obtained in said step (10);
   (12) combining plural ones of the features for each of the different categories to obtain similarity or difference of each category;
   (13) determining the distance in similarity or difference between said categories; and
   (14) changing said combination of features until said distance satisfies a predetermined condition.

13. The method of claim 12, which further comprises a step (15) of determining a threshold value between the similarity or difference in said each category and the similarity or difference in another category, for discriminating the category of said input image based on comparison between the similarity or difference of said input image and said threshold.

14. A method of generating reference data for image inspection/recognition, comprising:
   (1) extracting a plurality of image features from each of a plurality of training images of a same first category and forming first feature images;

(2) quantizing said first feature images with a predetermined quantization step to obtain first quantized feature images;

(3) obtaining a distribution of feature values at each feature point in said first quantized feature images of each feature;

(4) determining the weight of said each feature point on the basis of said distribution at said each feature point in each of said first feature images to obtain a reference feature image having weighted feature values at respective feature points;

(5) generating quantized second and third feature images from a second training image of said first category and a third training image of a second category for each of the features;

(6) obtaining the similarity or difference in each feature between said reference feature image and each of said second and third feature images by calculating a weighted correlation in feature value between said reference feature image and each of said second and third feature images;

(7) determining a weight of each of said features on the basis of said similarities or differences in said each feature corresponding to said second and third feature images of said first and second categories, respectively;

(8) selecting desired ones of said features, combining the reference images of the selected features through the corresponding weights and obtaining the distance between said similarities or differences corresponding to said first and second categories; and (9) changing the selection of said features, repeating said step (8) until said distance becomes sufficiently large and determining the feature points and the corresponding weights as reference data of a final combination.

15. The method of claim 14, wherein said correlation operation in said step (6) is a weighted generalized Hough transform operation of voting the weights at the feature points of said reference data to a parameter space.

16. The method of claim 14, wherein said correlation operation in said step (6) is a weighted normalized correlation operation between a sequence of feature points in said first feature image used as weights and a sequence of feature points in said second or third feature image.

17. The method of claim 14, wherein said correlation operation in said step (6) is performed by subjecting said quantized feature image to a weighted Hough transform operation of voting the weights of said feature points in each of quantized levels to a parameter space to obtain Hough planes and by calculating the difference between corresponding ones of said feature images on said Hough planes.

18. An apparatus for generating reference data for image inspection/reception, comprising:

an image memory for storing training images of a first category;

means for extracting images of different features from each of said training images and forming feature images;

means for quantizing each of said feature images with a predetermined quantization step;

feature image memory means for storing said quantized feature images;

means for obtaining from said quantized feature images of each feature a distribution of feature values of the quantized feature images at each corresponding feature point;

feature point value distribution memory means for storing said distributions of feature values for each of said features in each of said first and second categories;

means for determining a weight for each of the feature points from corresponding ones of said feature point value distributions for each of said first and second categories;

reference table memory means for storing said feature points and corresponding weights as a reference image for each feature image;

weight similarity and difference calculating means for performing a correlation operation between each of training feature images in each of said first and second categories and said reference image stored in said reference table memory means to obtain a weighted similarity or difference of each training feature image;

similarity and difference distribution memory means for storing the distribution of said weighted similarities or differences of the training feature images for each of said first and second categories;

means for obtaining the feature weight from said similarity or difference distributions of the corresponding features in said first and second categories;

means for determining the combination of different features in both said first and second categories and for obtaining the distance between the weighted similarity or difference in said first category and the corresponding weighted similarity or difference in said second category; and means for changing said feature combination until said distance satisfies a predetermined condition and for determining combined weights at respective feature points corresponding to a final feature combination as reference dam.

19. An image inspection/recognition method comprising the steps of:

(1) extracting an image feature from an input image and forming a feature image;

(2) quantizing said feature image with a predetermined quantization step to obtain a quantized feature image; and (3) calculating the similarity between each feature point in said quantized feature image and reference data of the corresponding features obtained with training images of the same category;

said step (3) comprising:

(4) generating from said quantized feature image a multiple bit plane composed of bit planes corresponding to respective quantized levels of said quantized feature images;

(5) subjecting each bit plane of said multiple bit plane to a Hough transform operation to form a multiple Hough plane; and (6) obtaining similarity by calculating the difference between said multiple Hough plane and said reference data used as a reference multiple Hough plane.

20. The method of claim 19 or 3, wherein said step (1) is repeated to obtain a plurality of feature images, and said calculation of said step (3) is repeatedly performed for predetermined bit planes of each of multiple bit planes obtained form said plural feature images by a weighted calculation using the weights to said predetermined bit planes.

21. The method of claim 20, wherein the bit planes to be used in said step (3) are determined by the steps of:

(7) obtaining a plurality of quantized feature images from a plurality of training images of a plurality of categories;

(8) generating multiple bit planes from each of said quantized feature images;

(9) determining the similarity or difference of each of said bit planes of said plurality of multiple bit planes by the same operation as in said step (3) through the use of said reference data used therein;

(10) obtaining the weight of said each bit plane at a feature value level from said similarity or difference;

(11) combining said bit planes and obtaining the distance between the similarity or difference in one category and the similarity or difference between different categories; and

(12) changing said combination of bit planes until said distance satisfies a predetermined condition.

* * * * *